United States Patent
Lee et al.

(10) Patent No.: US 10,796,488 B2
(45) Date of Patent: Oct. 6, 2020

(54) ELECTRONIC DEVICE DETERMINING SETTING VALUE OF DEVICE BASED ON AT LEAST ONE OF DEVICE INFORMATION OR ENVIRONMENT INFORMATION AND CONTROLLING METHOD THEREOF

(71) Applicant: Samsung Electronics Co., Ltd., Gyeonggi-do (KR)

(72) Inventors: Jangwoo Lee, Seoul (KR); Suhyun Na, Gyeonggi-do (KR); Taeho Wang, Seoul (KR); Sunmi Jin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/057,952

(22) Filed: Aug. 8, 2018

(65) Prior Publication Data
US 2019/0102947 A1    Apr. 4, 2019

(30) Foreign Application Priority Data
Sep. 29, 2017   (KR) .................. 10-2017-0127428

(51) Int. Cl.
*G06T 19/00*   (2011.01)

(52) U.S. Cl.
CPC ........ *G06T 19/006* (2013.01); *G06T 2210/04* (2013.01)

(58) Field of Classification Search
None
See application file for complete search history.

(56) References Cited

U.S. PATENT DOCUMENTS

| | | |
|---|---|---|
| 6,970,812 B2 | 11/2005 | Kamachi et al. |
| 7,769,764 B2 | 8/2010 | Ramer et al. |
| 8,041,717 B2 | 10/2011 | Ramer et al. |
| 8,560,537 B2 | 10/2013 | Ramer et al. |
| 9,195,993 B2 | 11/2015 | Ramer et al. |
| 2002/0002514 A1 | 1/2002 | Kamachi et al. |
| 2003/0073412 A1* | 4/2003 | Meade, II ............. G08C 17/02 455/70 |
| 2007/0061300 A1 | 3/2007 | Ramer et al. |

(Continued)

FOREIGN PATENT DOCUMENTS

| | | |
|---|---|---|
| JP | 2002-15156 A | 1/2002 |
| JP | 2017-34427 A | 2/2017 |

(Continued)

*Primary Examiner* — Patrick F Valdez
(74) *Attorney, Agent, or Firm* — Cha & Reiter, LLC.

(57) ABSTRACT

An electronic device and method are disclosed. The electronic device includes a processor which implements the method, including displaying a virtual environment in which a first device is disposed on a display, the virtual environment simulating a real environment, detecting by at least one processor virtual environment information about the virtual environment, detecting virtual device information about the first device disposed in the virtual environment and at least one second device disposed in the virtual environment, determining a setting value for the first device based on at least one of the virtual environment information and the virtual device information, and storing the determined setting value in a memory.

18 Claims, 12 Drawing Sheets

(56) References Cited

U.S. PATENT DOCUMENTS

| | | | |
|---|---|---|---|
| 2008/0203928 A1* | 8/2008 | Frumau | H05B 37/0272 |
| | | | 315/151 |
| 2010/0289643 A1* | 11/2010 | Trundle | G08C 19/16 |
| | | | 340/545.1 |
| 2010/0293051 A1 | 11/2010 | Ramer et al. | |
| 2011/0029387 A1 | 2/2011 | Ramer et al. | |
| 2012/0036010 A1 | 2/2012 | Ramer et al. | |
| 2013/0207963 A1* | 8/2013 | Stirbu | G06F 3/011 |
| | | | 345/419 |
| 2014/0046761 A1 | 2/2014 | Ramer et al. | |
| 2016/0120009 A1* | 4/2016 | Aliakseyeu | H05B 37/0272 |
| | | | 315/131 |
| 2016/0180384 A1 | 6/2016 | Ramer et al. | |
| 2016/0203749 A1 | 7/2016 | Steyskal et al. | |
| 2017/0238401 A1* | 8/2017 | Sadwick | A61N 5/01 |
| | | | 315/294 |
| 2019/0035569 A1* | 1/2019 | Sadwick | H05B 47/11 |

FOREIGN PATENT DOCUMENTS

| | | | | |
|---|---|---|---|---|
| KR | 10-0483134 B1 | 8/2005 | | |
| KR | 10-2016-0118636 A | 10/2016 | | |
| WO | 2015047288 A1 | 4/2015 | | |
| WO | WO-2019051060 A1 * | 3/2019 | | G06F 3/0488 |

\* cited by examiner

ELECTRONIC DEVICE DETERMINING SETTING VALUE OF DEVICE BASED ON AT LEAST ONE OF DEVICE INFORMATION OR ENVIRONMENT INFORMATION AND CONTROLLING METHOD THEREOF

CROSS-REFERENCE TO RELATED APPLICATION(S)

This application is based on and claims priority under 35 U.S.C. § 119 to Korean Patent Application No. 10-2017-0127428, filed on Sep. 29, 2017, in the Korean Intellectual Property Office, the disclosure of which is incorporated by reference herein its entirety.

BACKGROUND

1. Field

The present disclosure relates to a technology for determining a setting value of a device based on at least one of device information or environment information.

2. Description of Related Art

As the number of Internet users increases, various products are now sold, purchased or exhibited on the Internet. It may even be more economical to purchase products using Internet retailers (i.e., Internet shopping). However, since the user cannot examine products directly in person when purchasing products online, the user may fail to complete an Internet purchase.

Therefore, an Internet retailers generally provide services to simulate sales. For example, a furniture Internet shopping provider may facilitate customer identification of furniture suitable for a real environment based on displaying the furniture within a representative virtual environment, by providing a virtual service.

The above information is presented as background information only to assist with an understanding of the present disclosure. No determination has been made, and no assertion is made, as to whether any of the above might be applicable as prior art with regard to the present disclosure.

SUMMARY

However, there is a great difference between goods experienced via a virtual simulation, and goods experienced after purchase in the conventional simulation service. Therefore, in the case of the conventional simulation service, the customer's satisfaction with purchasing through the virtual simulation did not increase significantly.

Aspects of the present disclosure are to address at least the above-mentioned problems and/or disadvantages and to provide at least the advantages described below. Accordingly, an aspect of the present disclosure is to provide an electronic device determining a setting value of a device based on at least one of device information or environment information, and a controlling method thereof.

In accordance with an aspect of the present disclosure, an electronic device is disclosed including a display, a processor, and a memory storing instructions executable to cause the device to display a virtual environment in which a first device is disposed on the display, the virtual environment simulating a real environment, detect virtual environment information about the virtual environment, detect virtual device information about the first device disposed in the virtual environment and at least one second device disposed in the virtual environment, determine a setting value for the first device based on at least one of the virtual environment information and the virtual device information, and store the determined setting value in the memory.

In accordance with another aspect of the present disclosure, a method is disclosed including displaying a virtual environment in which a first device is disposed on a display, the virtual environment simulating a real environment, detecting by at least one processor virtual environment information about the virtual environment, detecting virtual device information about the first device disposed in the virtual environment and at least one second device disposed in the virtual environment, determining a setting value for the first device based on at least one of the virtual environment information and the virtual device information, and storing the determined setting value in a memory.

According to various embodiments of the present disclosure, it is possible to provide a service for determining a setting value of a device before the purchase of the device.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Prior to describing an embodiment of the present disclosure, an integrated intelligent system to which an embodiment of the present disclosure is capable of being applied will be described.

Figure 1:
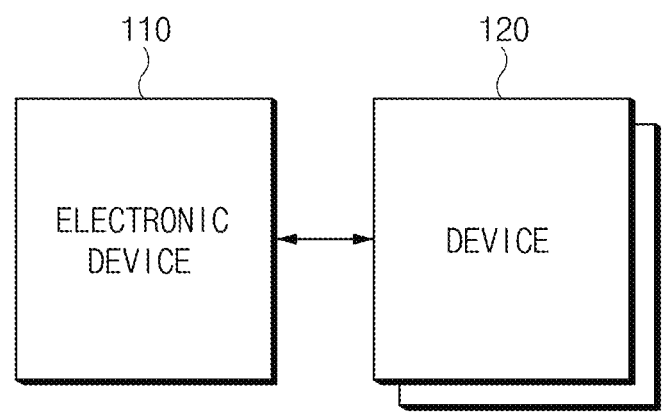
FIG. 1 is a block diagram illustrating an electronic system, according to an embodiment.

FIG. 1 is a block diagram illustrating an electronic system, according to an embodiment.

Referring to FIG. 1, according to an embodiment, an electronic system 10 may include an electronic device 110 and at least one device 120.

According to an embodiment, the electronic device 110 may determine a first device, which is recommended to a user, from among a plurality of devices. The electronic device 110 may display a virtual environment in which the first device is disposed, and may verify virtual environment information about the virtual environment. The electronic device 110 may verify virtual device information about the first device disposed in the virtual environment and at least one second device disposed at a periphery of the first device in the virtual environment and may determine the setting value of the first device based on the virtual environment information and the virtual device information.

For example, in the case where the first device and at least one second device are present in the virtual environment, the electronic device 110 may determine the setting value of at least one device based on virtual device information (e.g., output information of each device) and virtual environment information. For another example, in the case where the first device is present in the virtual environment and the at least one second device is absent, the electronic device 110 may determine the setting value of the first device based on the virtual environment information. The electronic device 110 may store the determined setting value of the first device. For the purpose of compensating a difference between a virtual environment and a real environment, the electronic device 110 may determine the setting value or may correct the determined setting value.

For example, the virtual environment information may include at least one of space size information of the virtual environment, spatial reverberation information of the virtual environment, peripheral color information of the virtual environment, or obstacle information included in the virtual environment. For example, the virtual device information may include at least one of location information of the first device, output information of the first device, the location information of the at least one second device, the output information of the at least one second device, user location information, and distance information between the first device, the at least one second device, and users.

According to an embodiment, the electronic device 110 may determine the setting value of the second device as well as the first device based on the virtual environment information and the virtual device information. The detailed configuration of the electronic device 110 will be described below. Hereinafter, an embodiment is exemplified as the electronic device 110 determines the setting value of each of the first device and the at least one second device (hereinafter referred to as "at least one device").

The determined setting value may correspond to the output of the at least one device 120 (e.g., at least one of the first device and the second device). For example, when at least one device is a speaker, the output of each device may be a sound. In this case, the set value of each device may be associated with at least one of a sound quality factor, for example, volume information, sound effect information, or equalizer information. For another example, when at least one device is a display, the output of the at least one device may be an image. In this case, the setting value of each device may be associated with at least one of the picture quality factors, for example, color information, contrast information, brightness information, contrast information, and resolution information. For another example, when at least one device is a lighting fixture, the output of the at least one device may be light. In this case, the setting value of each device may be associated with at least one of illumination information, lighting direction information, lighting pattern information, or a lighting color. For another example, when at least one device is an air conditioner, the output of the at least one device may be airflow. In this case, for example, the setting value of each device may be associated with at least one of target temperature, target humidity, power management, an airflow direction, an airflow volume, or an airflow pattern. For another example, when at least one device is a projector, the output of the at least one device may be a projection image. In this case, for example, the setting value of each device may include at least one of a picture quality factor associated with the projection image, a projection image size, a projection direction, or a focal distance.

The electronic device 110 may be one device, and may be a combination of a plurality of devices. For example, the electronic device 110 may include at least one of a web server or a user terminal. For example, the web server may be an advertisement server providing a virtual environment in which a user virtually experiences the device 120 for sale. For example, the user terminal may be a terminal of the user who desires to purchase (or virtually experience) the device 120 and an application for providing the virtual environment itself or providing the virtual environment by communicating with an advertisement server may be installed in the user terminal. For example, the user terminal may include a smartphone, iPad, a tablet PC, a notebook PC, and the like.

According to an embodiment, the at least one device 120 may include an Internet of things (IoT) device. The at least one device 120 may communicate in at least one manner, for example, Bluetooth, near field communication (NFC), or Wi-Fi. For example, the at least one device 120 may be a device outputting at least one of an image, a sound, light, and airflow. For example, the device 120 may include at least one of a speaker, a display device, a TV, a lighting fixture, an air conditioner, a projector, or the like.

The at least one device 120 may include at least one of the first device or the at least one second device. For example, the first device may be a device that is recommended or to be recommended by the electronic device 110. For example, the second device may be a device coexisting with the first device (hereinafter referred to as a "recommended device") in a real environment in which the first device is disposed. For example, the second device (hereinafter referred to as a "retained device") may be a device disposed in advance in the real environment or may be a device to be disposed (or installed) in a specified environment.

At least one device (e.g., the first device or the second device) may receive a setting value determined from the electronic device 110 may set each output (or the setting factor of each output) of each device, depending on the received setting value. For example, in the case where the at least one device includes a plurality of speakers, the setting value may include a setting value of a sound quality factor (e.g., volume) associated with each speaker. As such, a player outputting a sound via a respectively plurality of speakers or a plurality of speakers may set a sound quality factor of each speaker depending on the received setting value and may output the sound corresponding to the set sound quality factor. For another example, the first device may verify real time information such as time, weather, or the like, from an embedded component, the electronic device 110 or another device and may control the output so as to correspond to the setting value and the real time information. In particular, when the first device is a lighting fixture and the setting value allows a lighting color to be changed depending on the weather or the time range, the first device may output a lighting color corresponding to the time range.

Figure 2:
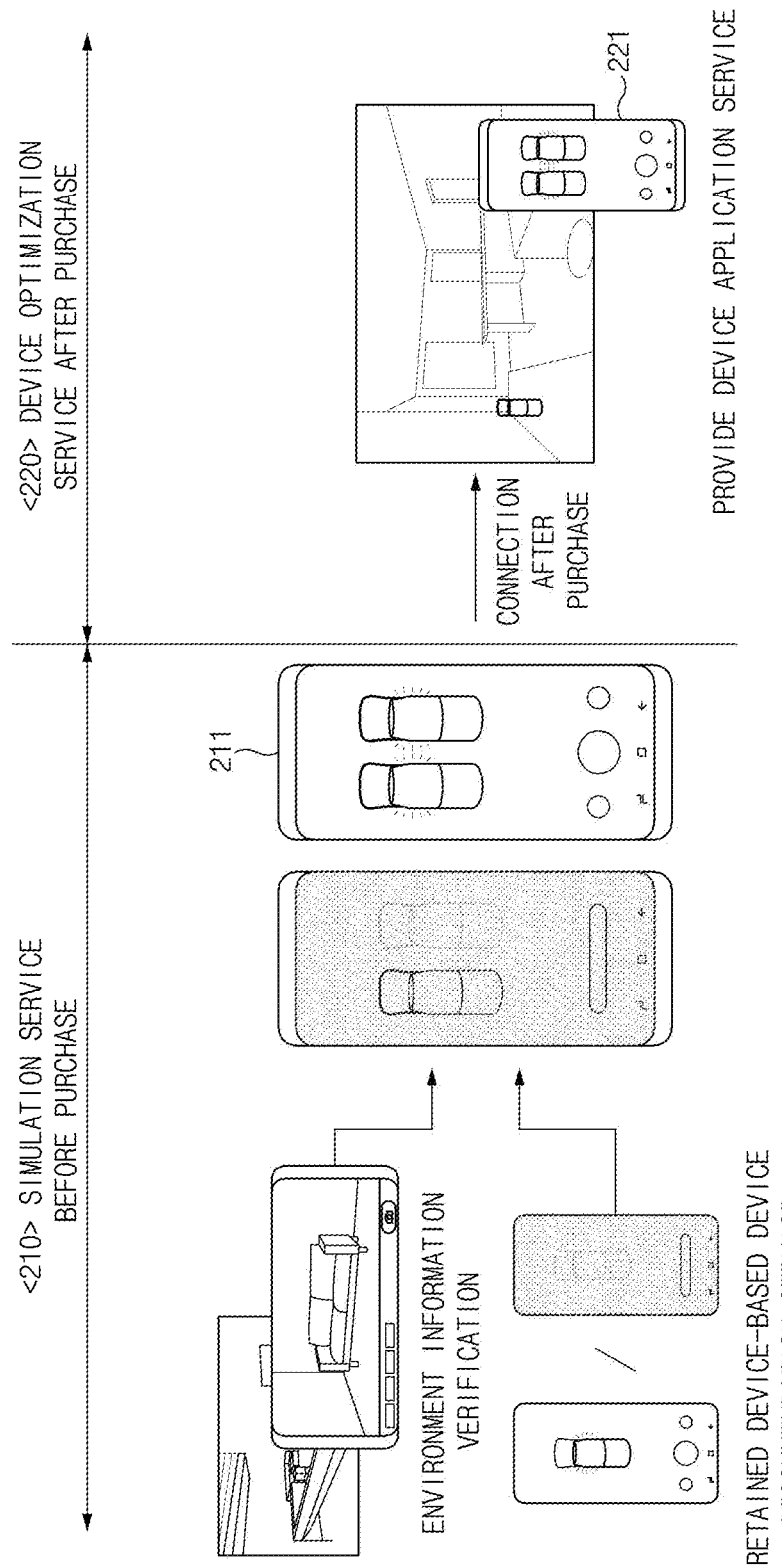
FIG. 2 is a view illustrating a user interface (or UI) screen of an electronic device, according to an embodiment.

FIG. 2 is a view illustrating an example UI screen of an electronic device (e.g., the electronic device 110 of FIG. 1), according to an embodiment.

Referring to FIG. 2, as illustrated in an image 210, the electronic device 110 may provide at least one of a device recommendation service, an advertisement service, or a simulation service through an advertisement platform (e.g., a website, an app, or the like) at a first point in time, for example, before a user purchases a recommended device. For another example, the first point in time may be before the recommended device is disposed (or installed) in a real environment. For example, the device recommendation service may include a service to determine a product to be recommended to a user, based on at least one of user preference or a retained device. The advertisement service may include a service to enter promotion information about a device on sale. For example, the simulation service may be a simulation service according to at least one of the verification of virtual or real environment information, the verification of virtual device information, the determination of a setting value of each device, or the arrangement of a device on the virtual environment. For example, in the case where the recommended device is a lighting fixture, as illustrated in an image 211, the electronic device 110 may provide a simulation estimating how light and illumination will appear in the environment in which the lighting fixture is to be installed, including a direction, pattern, and color of the lighting fixture depending on the setting value associated with the output of the recommended lighting fixture. The image 211, for example, is rendered based on training for images including light and illumination of the lighting fixture installed in various real environments. The image 211 may be 3D image or 2D image. The setting values, which are about light or illumination of the lighting fixture corresponding to the various real environments, are previously stored in memory. The electronic device 110 may render and display the image 211 based on the setting values stored in memory.

As illustrated in 220, the electronic device 110 may provide a device application service for operation at a second point in time, for example, after the purchase of the recommended device. For another example, the second point in time may be after recommended device is installed in the real environment. For example, the device application service may include at least one transmitting a setting value of a device, a correction of the setting value to correspond to the real environment, or a display of the area in which the device is installed or will be installed. For example, in the case where the recommended device is a lighting fixture, when the device application service is requested after the purchase of the lighting fixture, as illustrated in an image 221, the electronic device 110 may correct a setting value so as to correspond to the real environment through simulation, may allow light to be output in the illumination, direction, pattern, or color depending on the corrected setting value, and may provide a device application service to transmit the corrected setting value to the device.

Figure 3:
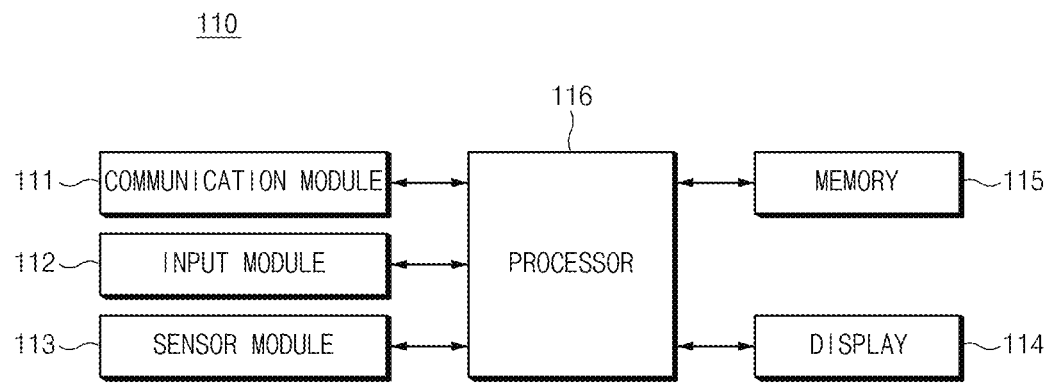
FIG. 3 is a block diagram illustrating an electronic device, according to an embodiment.

FIG. 3 is a block diagram illustrating an electronic device (e.g., the electronic device 110 of FIG. 1), according to an embodiment.

Referring to FIG. 3, according to an embodiment, the electronic device 110 may include a communication module 111, an input module 112, a sensor module 113, a display 114, a memory 115, and a processor 116. According to an embodiment, the electronic device 110 may exclude some components or may further include other additional components. According to an embodiment, some of the components of the electronic device 110 may be combined with each other so as to form one entity, so that the functions of the components may be performed in the same manner as before the combination. Each of the components of the electronic device 110 may be included in a plurality of devices (e.g., a server and a terminal). The relation between the input and the output illustrated in FIG. 3 may be exemplified for descriptive convenience. Accordingly, embodiments of the present disclosure may not be limited thereto.

According to an embodiment, the communication module 111 may include a communication circuit and may establish a communication channel with at least one device (e.g., the at least one device 120 of FIG. 1) by using the communication circuit under control of the processor 116. For example, the communication channel may include at least one communication channel of Bluetooth, near field communication (NFC), or Wi-Fi.

According to an embodiment, the input module 112 may include an input circuit (or an input device) and may receive a user input by using the input circuit. For example, the input circuit may include at least one of a touch pad, a key pad, or a gyro sensor circuit. For example, the user input may include a request for the specified service to the device 120. For example, the user input may include an input associated with environment information. For example, the specified service may include at least one of a device recommendation service, an advertisement service, a simulation service, or a device application service.

According to an embodiment, the sensor module 113 may include a sensing circuit (e.g., a sensor IC) and may sense at least part of environment information by using the sensing circuit under control of the processor 116. For example, the sensor module 113 may include at least one of a camera, a GPS sensor, a speaker and a microphone, an illumination sensor, a humidity sensor, or a temperature sensor.

The display 114 may include, for example, a liquid crystal display (LCD), a light-emitting diode (LED) display, an organic LED (OLED) display, or an electronic paper display. The display 114 may display, for example, various kinds of content (e.g., a text, an image, a video, an icon, and/or a symbol) to a user. According to an embodiment, the display 114 may output at least one of a virtual environment image or a real environment image, under control of the processor 116.

The memory 115 may be a volatile memory (e.g., a RAM or the like), a nonvolatile memory (e.g., a ROM, a flash memory, or the like), or the combination thereof. For example, the memory 115 may store one or more instructions or data associated with at least one other component(s) of the electronic device 110. According to an embodiment, the memory 115 may store one or more instructions or data for at least one of an advertisement service, a device recommendation service, a simulation service, or a device application service.

For example, the processor 116 may include at least one of a central processing unit (CPU), a graphic processing unit (GPU), a microprocessor, an application processor (AP), an application specific integrated circuit (ASIC), or field programmable gate arrays (FPGA) and may have a plurality of cores. The processor 116 may perform data processing or an operation associated with control and/or communication of at least one other element(s) of the electronic device 110.

According to an embodiment, the processor 116 may provide at least one of an advertisement service, a device recommendation service, a simulation service, or a device application service, through a specified advertisement platform. For example, the advertisement platform may be provided through a specified application or a specified web. For example, the specified application (or the specified web) may be an application (or a web) that provides a service to sale or simulate a device.

According to an embodiment, when a specified advertisement platform is executed, the processor 116 may determine whether the retained device of the user, which is installed in the real environment (e.g., an environment registered by a user) or which is scheduled to be installed is present, based on connection history information (or user identification information). For example, the connection history information may include at least one of login information about a specified web, identification information of a specified application, or identification information about the device (e.g., the electronic device 110 and the at least one device 120 of FIG. 1). The processor 116 may verify connection history information by using, for example, the communication history of the communication module 111, the communication history of an application communicating with a web, user access permission information (e.g., ID), or the like. For example, the processor 116 may verify current connection history information, may obtain retained device list information corresponding to the current connection history information from the memory 115, and may verify the retained device of the user from the obtained retained device list. In the case where the retained device list stored in the memory 115 is absent, the processor 116 may determine that the retained device is absent.

According to an embodiment, after verifying the retained device of the user, the processor 116 may determine (device recommendation service) a recommended device, which is recommended to the user. In the case, the processor 116 may determine the recommended device based on at least one of retained device list information, device correlation information, priority information, or user preference information. For example, the device correlation information may include information about the output of the device or correlation (whether devices are the same as each other) of a device function. For example, the priority information may be information indicating the priority of a plurality of devices (e.g., devices on sale). The priority information may be set by default based on marketing priority. For example, the user preference information may include at least one of the user's preference (e.g., function usage frequency or the latest order) for a function, the user's preference (e.g., usage frequency, or the like) for the device or interest information (e.g., favorites, search frequency, web access history information, or the like).

According to an embodiment, the processor 116 may determine that the device of the highest priority according to priority information is the recommended device. According to an embodiment, the processor 116 may change the priority of the recommended device, which is set by default, depending on at least one of device correlation information or user preference information and may determine that the device of the changed highest priority is the recommended device. When changing the priority of the recommended device, the processor 116 may increase the priority of a device, which has high correlation with the retained device or has the user's high preference or interest, from among recommended devices. As such, the processor 116 according to an embodiment may recommend, to the user, a device capable of being used in combination with the retained device or a device capable of having a high interest of the user.

According to an embodiment, in the case where the retained device of the user is present, the processor 116 may determine that a device, the type of which is the same as the type of the retained device, is the recommended device. For example, when the retained device is a speaker (or a speaker-embedded audio player), the processor 116 may determine that another speaker for extending a speaker channel by being connected to the retained device or for dividing a sound band for each speaker is the recommended device. On the other hand, the processor 116 may determine that a device, the type of which is different from the type of the retained device, is the recommended device. For example, when the retained device is a speaker, the processor 116 may determine that a lighting fixture capable of creating a mood upon using the speaker is the recommended device. For another example, when the retained device is a projector, the processor 116 may determine that the speaker capable of providing a sound effect is the recommended device.

According to an embodiment, the processor 116 may provide an advertisement service to the recommended device. For example, the processor 116 may provide the advertisement service to output the information (e.g., a function, an image, or the like) of the recommended device. For another example, the processor 116 may provide the advertisement service to simulate the output of the recommended device based on a default setting value.

According to an embodiment, when a simulation service is requested through the input module 112, the processor 116 may obtain information for the simulation service. The information for the simulation service may include at least one of a target setting value associated with the output of at least one device, virtual environment information about a virtual environment, in which the simulation service is provided, or virtual device information about the object of the simulation service.

According to an embodiment, for the purpose of verifying a target setting value of about at least one device, the processor 116 may display a message saying that "enter an output mode", on the display 114. When an output mode (e.g., movie watching mode) is designated through the input module 112, the processor 116 may verify a target setting value associated with the output of at least one device in a specified output mode. For example, the output mode may include at least one of modes included in a mode list provided by default by the recommended device or a mode added by the user. For example, the respective output may include at least one of a sound, an image, light, or airflow. For example, the target setting value may be associated with at least one of a sound quality factor, a picture quality factor, a lighting factor, and an airflow factor. For example, when the recommended device is a device (e.g., a speaker) outputting a sound, the target setting value may be a setting value associated with the sound quality factor. For example, the sound quality factor may include at least one of a volume setting, an equalizer setting, a reverb setting, a stereo effect setting, a multi-channel effect setting, or device allocation for each frequency area. For example, the device allocation for each frequency area may be that the frequency area of a sound output to each speaker is allocated. For another example, when the recommended device is a device (e.g., a display) outputting an image, the target setting value may be a setting value associated with the picture quality factor. For example, the picture quality factor may include at least one of brightness, contrast, color, intensity, or resolution. For another example, when the recommended device is a lighting fixture, the target setting value may be a setting value associated with the lighting factor. For example, the lighting factor may include at least one of a lighting illumination, a lighting direction, a lighting pattern, or a lighting color. For another example, when the recommended device is a device (e.g., an air conditioner) outputting airflow, a target setting value may be a setting value associated with an airflow factor. The airflow factor may include at least one of an airflow volume, an airflow direction, or an airflow pattern.

For the simulation service, the processor 116 may display a virtual environment, in which a recommended device is disposed, on the display 114. For example, the processor 116 may display the virtual environment on the display based on the image captured by using a camera (e.g., the sensor module 113). For another example, the processor 116 may display the virtual environment on the display 114 based on an input through the input module 112.

The processor 116 may verify virtual environment information about the virtual environment for providing the simulation service. For example, the processor 116 may verify the virtual environment information, based on a user input associated with the virtual environment in which at least one device is disposed or sensing information using a camera. For example, the virtual environment information may include space size information of the virtual environment, spatial reverberation information of the virtual environment, peripheral color information of the virtual environment, or obstacle information included in the virtual environment. The space size information may include at least one of, for example, information about horizontal and vertical lengths of the space and the type information of the space, as the space size information of a real environment in which each device is installed. The type information of the space may include at least one of a studio, a small-size room, a middle-size room, a large-size room, a chamber, a hall, or an opened space. The peripheral color information may include at least one of a background color of a space or a surrounding color of an area where a recommended device is to be installed. The obstacle information may include, for example, at least one of obstacle location information or surrounding media information that blocks sound, light, or the like.

The processor 116 may verify the virtual device information about the recommended device disposed in the virtual environment and at least one retained device disposed at a periphery of the recommended device in the virtual environment. For example, the virtual device information may include at least one of location information of the recommended device, output information of the recommended device, location information of the at least one retained device, output information of the at least one retained device, user location information, and distance information between the recommended device, the at least one retained device, and users. For example, location information of the respective device may be selected from a menu list (e.g., wall, corner, left, right, and the like) and may be entered as a virtual coordinate value, or the like.

The processor 116 may verify at least one of virtual environment information or virtual device information, based on an input through the input module 112. For example, the processor 116 may verify the spatial reverberation information based on the obstacle information (or surrounding media) (e.g., wall, floor, or the like) entered through the input module 112 (e.g., a key pad, a touch pad, a mouse, or the like). For another example, the processor 116 may verify at least one of space size information or peripheral color information, which is input through the input module 112. For example, the space size information may be selected from the list (e.g., a living room, or the like) in a menu, or the area value (e.g., a horizontal length or a vertical length) of the space may be entered. For another example, the processor 116 may output the virtual environment by using the display 114 and may verify user location information, based on a user location positioned on the virtual environment through the input module 112. Alternatively, for example, the processor 116 may verify the user location based on selection of the list (e.g., a left side, a corner, or the like) in a menu associated with device location information. The processor 116 may verify the entered device location in a manner the same as or similar to the user location. The processor 116 may verify at least one of virtual environment information or virtual device information based on information obtained by sensing, by using the sensor module 113, the real environment in which the recommended device is to be installed. For example, the sensor module 113 may be a camera. In this case, the processor 116 may capture the real environment by using a camera (e.g., a depth camera or an RGB camera) depending on the user's manipulation and may verify at least one of space size information, spatial reverberation information, obstacle information, user location information, location information of at least one device, or distance information between the user and the at least one devices, by using the captured image. For another example, the sensor module 113 may include a communication circuit (e.g., a GPS sensor, or a speaker and a microphone). In this case, the processor 116 may verify at least one of space size information of the environment, spatial reverberation information, peripheral color information, obstacle information, or distance information between the user, the retained device, and recommended devices, based on a signal received by using a communication unit. For another example, the sensor module 113 may include a passive element. The processor 116 may verify at least one of temperature information or humidity information according to an environment, based on a change in the characteristic of the passive element. For another example, the processor 116 may communicate with another electronic device providing weather information by using the communication module 111 to receive real time information.

According to an embodiment, the processor 116 may determine a setting value of at least one device associated with a virtual device or the retained device, based on at least one of virtual device information or virtual environment information.

According to an embodiment, in the case where at least one retained device coexisting with the recommended device is present in the virtual environment, the processor 116 may determine the setting value of at least one device based on a target setting value, virtual environment information, and virtual device information. Since the target setting value is determined based on a default environment, the processor 116 may determine the setting value of at least one device so as to reduce an output difference of at least one device due to a difference between the default environment and the virtual environment according to the virtual environment information. For example, in the case where the retained device and the recommended device output a sound, when the processor 116 verifies the difference between the real environment and the default environment according to environment information (e.g., space size or obstacle information (e.g., wall, ceiling, or the like)), the processor 116 may change the target setting value of the sound or the determined setting value so as to reduce a sound difference due to the difference between the real environment and the default environment. For another example, in the case where determining the difference between the real environment and the default environment according to the environment information (e.g., at least one of space size or background color), the processor 116 may change the target setting value of the lighting or the determined setting value so as to reduce a lighting difference due to the difference between the real environment and the default environment. For another example, the processor 116 may change the target setting value of a projection image according to the default environment or the determined setting value so as to reduce the change in the projection image due to the difference between the real environment and the default environment according to environment information (e.g., at least one of a space size or a background color of a projection area). Alternatively, the processor 116 may change the target setting value associated with airflow or the determined setting value so as to reduce a change in temperature due to a difference between the real environment and the default environment according to environment information (e.g., at least one of a space size or a sunlight amount).

In the case where the type of the retained device is the same as the type of the recommended device, the processor 116 may determine the setting value of at least one device such that the combination (e.g., sum) of the output of the recommended device and the output of at least one respective retained device corresponds to the target setting value of the corresponding output. For example, in a specified output mode, the target volume level may be '9', the retained devices may be two speakers, and the recommended device may be one speaker. In this case, the processor 116 may determine that the volume level of each device is '3' such that the total output obtained by summing the outputs (volume) of two speakers (the retained devices) and the output (volume) of one speaker (the recommended device) is '9' (the target setting value) in the real environment.

In the case where the type of the retained device is different from the type of the recommended device, the output of the recommended device may be a first output (e.g., sound), and the output of the retained device may be a second output (e.g., light). In this case, the processor 116 may verify the target setting value associated with the second output of the retained device corresponding to the first output of the recommended device; in the case where the first output of the recommended device is generated, the processor 116 may determine the setting value of at least one device such that the second output of the retained device corresponds to the target setting value. For example, when the retained device is a speaker and when the recommended device is a lighting fixture, in the case where the sound output of the speaker is generated, the processor 116 may determine the setting value of at least one device so as to differently control a lighting color. Additionally, the processor 116 may determine the setting value of the lighting fixture such that the lighting color corresponds to environment information (e.g., the lighting color corresponds to a peripheral color). For another example, when the retained device is a projector and when the recommended device is a speaker device, in the case where the projector outputs the type of specified content, the processor 116 may determine the setting value of at least one device that changes the sound quality factor of the speaker device depending on the target setting value. For another example, when the retained device is a speaker device and when the recommended device is an air conditioner, in the case where the sound output of the speaker is generated, the processor 116 may determine the setting value of the air conditioner so as to vary the airflow factor of the air conditioner.

According to an embodiment, in the case where the retained device coexisting with the recommended device is absent in the real environment, the processor 116 may determine the setting value of the recommended device, based on the target setting value and the virtual environment information. For example, the processor 116 may adjust the target setting value corresponding to the specified mode so as to correspond to the virtual environment information and may determine the setting value of the recommended device so as to correspond to the target setting value (or the output according to target setting value) to which the output of the recommended device according to the setting value of the recommended device is adjusted. According to an embodiment, the processor 116 may store the setting value of at least one device in the memory 115. According to various embodiments, the processor 116 may set the setting value of at least one device further based on real time information. For example, the real time information may include at least one of time, date, or temperature/humidity information. The real time information may be entered through the input module 112.

According to an embodiment, the processor 116 may output information associated with a simulation service by using the display 114. For example, the processor 116 may output at least one piece of device information (e.g., a device image, a function, a setting value, a setting value simulation image, or the like).

According to an embodiment, the processor 116 may configure a virtual environment corresponding to the virtual environment information to output the virtual environment by using the display 114 and may simulate each output of at least one device so as to correspond to the setting value of at least one device on the virtual environment. The virtual environment may be, for example, an image such as a plan view or a stereoscopic view or may be an image generated using at least part of images obtained by capturing a real environment. The processor 116 may provide a virtual environment as a two-dimensional image and may provide a three-dimensional image, for example, a virtual reality (VR) image or an augmented reality (AR) image. For example, the processor 116 may provide the user with a service for arranging at least one of the recommended device or the retained device on the virtual environment, based on an input through the input module 112. For another example, the processor 116 may provide the user with a service to simulate each output of at least one device corresponding to the setting value of the recommended device on the virtual environment. In particular, in the case where both the retained device and the recommended device are lighting fixtures, the processor 116 may output the lighting of the retained device by using the display 114 so as to correspond to the setting value of the retained device and may output the lighting of the recommended device by using the display 114 so as to correspond to the setting value of the recommended device.

According to an embodiment, in the case where the arrangement (or a location) of at least one device of the recommended device or the retained device is changed on the virtual environment through the input module 112, the processor 116 may change the virtual environment displayed on the display 114 and may re-verify virtual environment information and virtual device information based on the changed virtual environment. The processor 116 may re-determine the setting value of the recommended device so as to correspond to the re-verified virtual environment information and the re-verified virtual device information.

According to an embodiment, the processor 116 may store service history information using an advertisement platform. For example, the service history information may include at least one of connection history information, virtual environment information, information about each virtual device, a setting value of each device, or a virtual environment image. Each pieces of information included in the service history information may be stored in association with each other. For example, the service history information may be used as information for simulating the output of each device on the virtual environment so as to correspond to the determined setting value. For example, the processor 116 may configure the virtual environment based on the virtual environment information in the service history information and may place each device on the virtual environment based on the virtual device information to display each device on the display 114. The processor 116 may reproduce the output of each device depending on the setting value of each device. Additionally or alternatively, the service history information may be used to correct the setting value of each device based on the difference between the real environment and the virtual environment.

According to an embodiment, when a device application service is requested through the input module 112, the processor 116 may provide a device application service. For example, the device application service may include at least one of the verification of information about a real device disposed in the real environment, the display of real device information (e.g., arrangement area information of each device on the real environment image) in a real environment image, the correction of a setting value of a device, or the setting of each device.

According to an embodiment, when the recommended device is installed in the real environment, the processor 116 may transmit the setting value stored in the memory 115 to the recommended device (or the retained device) through the communication module 111. For example, the processor 116 may verify information about each device (e.g., the recommended device or the retained device) disposed in the real environment, by using at least one of the sensor module 113 or the communication module 111. For example, the verified device information may include at least one of device identification information or a device image. For example, when receiving information (e.g., device identification information) about each device through the communication module 111, the processor 116 may verify the information about the each device. For another example, the processor 116 may verify the device image from the image captured by using a camera. For another example, the processor 116 may verify service history information of each device stored in the memory 115, based on the device information. For example, the service history information may include at least one of installation area information of each device or function information (e.g., right-side lighting, right-side speaker, or the like) of each device.

According to an embodiment, the processor 116 may display the verified real device information on the display 114. For example, the processor 116 may display at least one of installation area information of each device or function information of each device, based on service history information of each device. For another example, the processor 116 may capture the real environment including the recommended device by using a camera and may display installation area information of the recommended device on the real environment image. The processor 116 may verify installation area information of the recommended device from service history information based on information about each device location. For another example, the processor 116 may display function information of each device on the real environment image.

According to an embodiment, when verifying a difference between the virtual environment and the real environment, the processor 116 may correct the setting value of at least one device (e.g., at least one of the recommended device or the retained device) (e.g., the recommended device) so as to reduce an output difference due to the verified difference. For example, the processor 116 may re-verify (e.g., sense or receive) real environment information about the real environment, by using at least one of the input module 112 or the sensor module 113 and may correct the setting value of at least one device so as to correspond to the re-verified real environment information. For another example, in the case where the location of a device is changed in the real environment when being compared with the location of the device in the virtual environment, the processor 116 may correct the setting value of at least one device so as to correspond to the changed device location. For another example, in the case where the device is added, the processor 116 may correct the setting value of at least one device, based on correlation information between the added device and existing devices. As such, in an embodiment, in the case where the user additionally purchases a device or in the case where there is a difference between the default environment or the virtual environment and the real environment due to a change in the location of the device or the like, the processor 116 may change the setting value of the recommended device so as to be matched with an environment.

When the recommended device is installed in the real environment, the processor 116 may set at least one device by using the setting value of the at least one device. For example, the processor 116 may transmit the setting value of each device to each device (e.g., at least one of the retained device and the recommended device) by using the communication module 111. Each device may receive the setting value of each device and may set each output so as to correspond to the received setting value. As such, the output of the recommended device may be set to correspond to the determined setting value. For example, when the recommended device is installed in the real environment, the processor 116 may transmit the setting value of the recommended device to the recommended device before correcting the setting value so as to correspond to the real environment. For example, when the recommended device is installed in the real environment, the processor 116 may transmit the setting value of the recommended device to the recommended device after correcting the setting value so as to correspond to the real environment.

According to an embodiment, the processor 116 may provide a configuration interface for another setting associated with at least one device. For example, in the case where a device is a speaker device, a lighting fixture, or a projector, the other setting may include at least one of, for example, playback content, sound feedback (e.g., a notification, a button, or BGM), a date/time setting, a network setting, or a voice interaction setting (e.g., how to record a voice by using a microphone, or a voice tone). For another example, in the case where the device is a TV, the other setting may further include at least one of, for example, an application configuration, a subtitle setting, a function installation, or a remote controller setting. For example, the function installation may include function installation corresponding to a user input or user preference information. For example, the remote controller setting may include the function setting of a specified key corresponding to the user input or the user preference. For another example, in the case where the device is an air conditioner, the other setting may include at least one of function installation, a windless function execution condition, an air cleaning function execution condition, a date/time setting, a network setting, or a voice interaction setting (e.g., how to record a voice by using a microphone, or a voice tone). The date/time setting may include at least one of the date/time setting associated with each device or a setting for performing a specified function at a specified date and time.

Table 1 illustrates the setting value of each device, according to an embodiment.

TABLE 1

|  | Main setting factor | Sub setting factor |
| --- | --- | --- |
| Speaker | Sound quality factor (e.g., volume, equalizer setting, reverb, stereo effect, multi-channel effect, or device allocation for each frequency area) | Playback content sound feedback (e.g., alarm, button, BGM) Date/time setting Network setting Voice interaction setting (how to record a voice by using a microphone, voice tone) |
| Lighting fixture | Illumination Lighting color Lighting pattern Lighting direction | Sound feedback Date/time setting Network setting Voice interaction setting |
| Projector | Picture quality factor (brightness, color correction, contrast, or the like) Projection size Projection direction Focus setting | Playback content Sound feedback Function arrangement Date/time setting network setting voice interaction setting |

TABLE 1-continued

|  | Main setting factor | Sub setting factor |
| --- | --- | --- |
| TV | Picture quality factor (brightness, color correction, contrast, or the like) Device direction Sound quality factor | Scanning rate App configuration Playback content Subtitle setting (size, language, font, or the like) Function arrangement Date/time setting Network setting Voice interaction setting Remote controller setting |
| Air conditioner | Airflow volume (airflow strength) Airflow direction (wind strength) Airflow pattern Target temperature Target humidity Power management | Function arrangement Windless function Air cleaning function Date/time setting Network setting Voice interaction setting |

As illustrated in Table 1, the setting value of a device is associated with a main setting factor and a sub setting factor. The main setting factor may be set by default by the processor 116. The sub setting factor may be set based on a user input. For example, the processor 116 may determine a setting value associated with the main setting factor based on at least one of the target setting value of a specified mode, information (e.g., location information or output information) about a virtual (or real) device, user preference information, or information about a virtual (or real) environment. For another example, the processor 116 may determine the setting value associated with the sub setting factor, based on the user input. In more detail, when the setting value is set with respect to the specified output at the specified date and time through the user input, the processor 116 may output a specified output at the specified date and time so as to correspond to the setting value. On the other hand, the processor 116 may determine the optimal setting value with respect to a factor (e.g., sound quality factor in a sound feedback), which is capable of being differently set due to at least one of information about a virtual (or real) device, the user preference information, or information about a virtual (or real) environment in the sub setting factor.

Table 2 illustrates virtual (real) environment information and setting factors affected by the virtual (real) environment information, according to an embodiment.

| Environment information | Setting factor |
| --- | --- |
| Device location | Volume, equalizer setting, sound effect, reverb, stereo effect, multi-channel effect, device allocation for each frequency area, interaction method, sound feedback, voice interaction setting, picture quality factor, illumination, color, lighting direction, projection size, projection direction, focus, function arrangement, remote controller setting, airflow volume, airflow direction, airflow pattern, windless function, air cleaning function, target temperature, target humidity, power management, virus doctor, operation of an outdoor unit |
| Space size | Volume, equalizer setting, sound effect, reverb, stereo effect, multi-channel effect, device allocation for each frequency area, interaction method, sound feedback, voice interaction setting, illumination, color, lighting direction, projection size, projection direction, focus, function arrangement, remote controller setting, airflow volume, airflow direction, airflow pattern, windless function, air cleaning function, target temperature, target humidity, power management, virus doctor, operation of an outdoor unit |
| Peripheral color | Lighting illumination, lighting color, lighting direction, picture quality factor |
| User location | Volume, equalizer setting, reverb, stereo effect, multi-channel effect, device allocation for each frequency area, interaction method, sound feedback, voice interaction setting, picture quality factor, |

-continued

| Environment information | Setting factor |
|---|---|
| | illumination, color, lighting direction, projection size, projection direction, focus, function arrangement, remote controller setting, airflow volume, airflow direction, airflow pattern, windless function, air cleaning function, target temperature, target humidity, power management, virus doctor, operation of an outdoor unit |
| Temperature/ humidity | Sound quality factor, sound feedback, illumination, color, function arrangement, airflow volume, airflow direction, airflow pattern, windless function, air cleaning function, target temperature, target humidity, power management, virus doctor, operation of an outdoor unit |
| Obstacle location | Volume, equalizer setting, reverb, stereo effect, multi-channel effect, device allocation for each frequency area, interaction method, sound feedback, voice interaction setting, illumination, color, lighting direction, picture quality factor, projection size, projection direction, focus, function arrangement, remote controller setting, airflow volume, airflow direction, airflow pattern, windless function, air cleaning function, target temperature, target humidity, power management, virus doctor, operation of an outdoor unit |

According to an embodiment, the output of a device may be changed depending on virtual (real) device information (e.g., a user location or a device location), virtual (real) environment information (e.g., a space size, a peripheral color, or an obstacle location), real time information (e.g., temperature/humidity), or the like. Accordingly, due to the difference between the real environment and the virtual environment or the difference between the default environment and the real environment, since the output of a device is different from the output of a device set in the virtual environment, the output of a device may not be output as the optimal setting value. The processor 116 according to an embodiment may determine the setting value (optimal value) of at least one device in the virtual environment (or the default environment) and may allow the user to use the device in an optimal state by optimizing the determined setting value again based on the difference between the virtual environment and the real environment.

The above-described embodiment is exemplified as the processor 116 recommends one recommended device. However, alternatively, the processor 116 may recommend a plurality of recommended devices. In addition, the above-described embodiment is exemplified as the processor 116 determines the setting value of the recommended device with respect to a specified output mode. However, alternatively, in the case where the output mode is not designated, the processor 116 may determine the setting value of at least one device with respect to a default mode.

In the above-mentioned embodiment, in the case where virtual environment information is not verified, the processor 116 may determine the setting value of at least one device based on at least one of virtual environment information about the default environment or virtual device information.

In the above-mentioned embodiment, the processor 116 may change the setting value of at least one of the recommended device or the retained device, in response to a request through the input module 112.

According to an embodiment, an electronic device (e.g., the electronic device 110 of FIG. 3) includes a display (e.g., the display 114 of FIG. 3); a memory (e.g., the memory 115 of FIG. 3); and a processor (e.g., the processor 116 of FIG. 3) electrically connected to the memory, such that the processor is configured to display a virtual environment in which a first device is disposed on the display; verify virtual environment information about the virtual environment; verify virtual device information about the first device disposed in the virtual environment and at least one second device disposed at a periphery of the first device in the virtual environment; determine a setting value of the first device based on at least one of the virtual environment information or the virtual device information; and store the determined setting value in the memory.

The virtual environment information includes at least one of space size information of the virtual environment, spatial reverberation information of the virtual environment, peripheral color information of the virtual environment, or obstacle information included in the virtual environment. The virtual device information includes at least one of location information of the first device, output information of the first device, location information of the at least one second device, output information of the at least one second device, user location information, or distance information between the first device, the at least one second device, and a user.

The electronic device further includes a camera (e.g., the sensor module 113 of FIG. 3), such that the processor is configured to display the virtual environment on the display based on an image captured by using the camera.

The electronic device further includes an input module including an input circuit, such that the processor is configured to change the virtual environment displayed on the display, based on an input through the input module; and verify the virtual environment information and the virtual device information, based on the changed virtual environment.

The processor is configured to verify a target setting value of the first device stored in the memory; and determine the setting value of the first device based on the virtual device information such that each of an output of the first device and an output of the at least one second device corresponds to the target setting value.

The electronic device further includes an input module (e.g., input module 112 of FIG. 3) including an input circuit, such that the processor is configured to verify an output mode of the first device corresponding to an input through the input module; and verify the target setting value corresponding to the verified output mode.

The processor is configured to simulate an output of the first device on the virtual environment so as to correspond to the determined setting value.

The memory further stores user preference information, such that the user preference information is determined by the processor based on at least one of a preference function or a preference device of a user, and such that the processor is configured to determine the setting value of the first device further based on the user preference information.

The processor is configured to store the determined setting value in association with the virtual environment information and the virtual device information.

The electronic device further includes a communication module (e.g., the communication module 111 of FIG. 3), such that the processor is configured to when the first device is installed in a real environment, transmit the setting value stored in the memory, to the first device through the communication module.

The electronic device further includes a communication module (e.g., the communication module 111 of FIG. 3), such that the processor is configured to when the first device is installed in a real environment, verify real environment information about the real environment in which the first device is installed; correct the setting value stored in the memory based on the real environment information; and transmit the corrected setting value to the first device through the communication module.

The electronic device further includes a communication module (e.g., the communication module 111 of FIG. 3), such that the processor is configured to verify real device information about the first device disposed in a real environment and the at least one second device disposed at a periphery of the first device in the real environment; correct the setting value stored in the memory based on the real device information; and transmit the corrected setting value to the first device through the communication module.

The electronic device further includes a camera (e.g., the sensor module 113 of FIG. 3), such that the processor is configured to capture a real environment by using the camera; and verify at least one real environment information of space size information of the real environment, peripheral color information of the real environment, obstacle information included in the real environment, location information of the first device disposed in the real environment, location information of the at least one second device disposed in the real environment, information about a location of a user disposed in the real environment, or distance information between the first device, the at least one second device, and a user, which are disposed in the real environment, based on an image captured by using the camera.

The electronic device further includes a communication module (e.g., the communication module 111 of FIG. 3), such that the processor is configured to verify at least one of a date, a time, spatial reverberation information of a real environment, or distance information between the first device, the at least one second device, and a user, based on a signal received by using the communication module.

Figure 4:
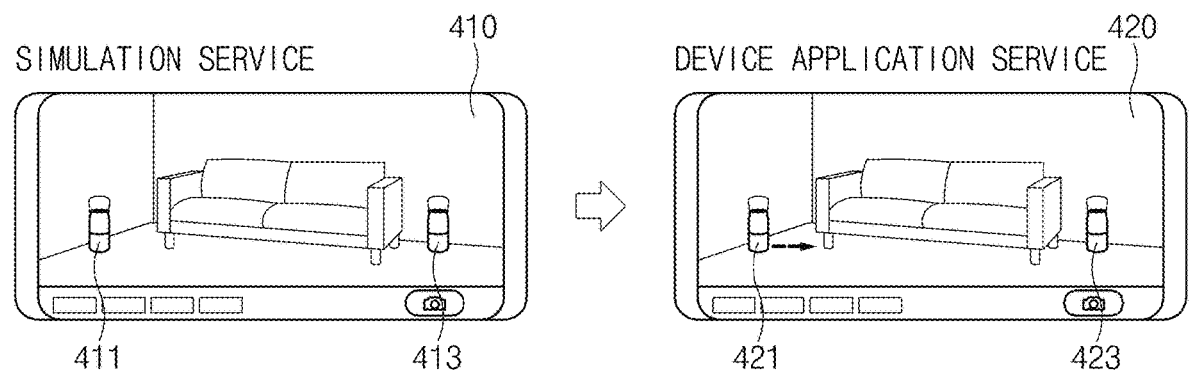
FIG. 4 is a view illustrating a UI screen of an electronic device in the case where a plurality of devices are lighting speakers, according to an embodiment.

FIG. 4 is a view illustrating a UI screen of an electronic device (e.g., the electronic device 110 of FIG. 1) in the case where a plurality of products/devices are speakers including a lighting function or "lighting speakers," according to an embodiment. The plurality of devices may include the retained device and the recommended device. The lighting speaker may perform as speakers (e.g., outputting sound) and as lighting (e.g., emitting some form of environmental lighting).

Referring to an virtual environment image 410, according to an embodiment, before a recommended device is disposed (or installed) in a real environment, a processor (e.g., the processor 116 of FIG. 3) may output a virtual environment image 410 on the display 114 using a captured image associated with the real environment in which the product is to be installed. For example, when a simulation service is requested, the processor 116 may output a guide message, which prompts a user to capture the real environment, by using the display 114, and may configure the virtual environment image 410 using the captured image of the real environment, and output the configured virtual environment image 410 on the display 114.

The processor 116 may display at least of an image (e.g., an image 411) of an already-installed device (i.e., a "retained device") or an image (e.g., an image 413) of the recommended device, on the virtual environment image 410. For example, the processor 116 may verify the retained device from retained device list information stored in the memory 115 and may communicate with the retained device by using the communication module 111 to determine whether the retained device is present in the captured image. The processor 116 may further verify virtual environment information, for example, a user location, a retained device location, a distance between a user and each device, obstacle information, peripheral color information, or the like using the captured image. When the user arranges the recommended device within the virtual environment image using an input module (e.g., the input module 112 of FIG. 3), the processor 116 may display an image (e.g., an image 413) of the recommended device disposed within the virtual environment image (or a virtual environment). The processor 116 may verify at least one of the location of the recommended device or a distance between the recommended device and the retained device, based on the arrangement location of the recommended device.

The processor 116 may determine the setting values (optimal values) of the recommended device and the retained device, based on the sensed or entered environment information and the device information. The processor 116 may determine the setting values of the recommended device and the retained device, further based on a specified output mode. The processor 116 may determine the setting values of the recommended device and the retained device, further based on the user input (e.g., selection associated with the lighting color of the recommended device).

The processor 116 may simulate each of outputs of the recommended device and the retained device on the virtual environment image by using the determined setting value. For example, the processor 116 may control the lighting of each of a recommendation lighting speaker and a retained lighting speaker, depending on the determined lighting setting value. In more detail, the processor 116 may simulate activation of the lighting of the recommendation lighting speaker in red depending on the setting value associated with recommendation lighting speaker and may turn on the lighting of the retained lighting speaker in blue depending on the setting value associated with retained lighting speaker. For another example, the processor 116 may simulate output the sound of the recommendation lighting speaker and the retained lighting speaker according to the determined sound setting value.

Referring to a real environment image 420, when the recommended device is installed in the real environment, the processor 116 may provide a device application service for facilitating application of the recommended device to the real environment.

According to an embodiment, when the advertisement platform is executed and the device application service is requested, the processor 116 may verify service history information. When pieces of service history information are present, the processor 116 may verify service history information for the device application service through the user's selection.

The processor 116 may allow the user to capture a real environment image 420 (or real environment) and may determine whether the retained device and a real device are included in the real environment image 420. For example, the processor 116 may communicate with each device by using the communication module 111 to verify device information; when determining whether the verified device information is device information corresponding to the service history information, the processor 116 may determine whether at least one of the retained device or the real device is included in the real environment image 420.

The processor 116 may display real device information (e.g., location information of the recommended device, arrangement area information, or the like) in the service history information, on the real environment image 420 based on location information of each device. For example, the processor 116 may display notifications such as "Red LED" and "This is the left channel speaker" on, overlaying or near a representation of a left lighting speaker 421 as displayed within the real environment image 420. The processor 116 may similarly display notifications "Blue LED" and "This is the right channel speaker" on, overlaying or near a right lighting speaker 423 included in the real environment image 420.

The processor 116 may further correct the setting value determined on the virtual environment, based on the real environment. For example, in a case where the lighting speaker 421 is moved to the center (i.e., referring to dotted arrow depicted in the image 420 of FIG. 4), the processor 116 may re-determine the setting values of the lighting speakers 421 and 423 based on the movement location of the lighting speaker 421.

When the re-determined setting value is transmitted to each of the lighting speakers 421 and 423, the processor 116 may allow each of the lighting speakers 421 and 423 to be driven or operated in accordance with the re-determined setting value.

As well as determining the setting value (e.g., an optimal value) of each device in the virtual environment based on an environment in which each device is disposed, the processor 116 according to an embodiment may allow each device to be disposed to correspond to the setting value in the real environment.

Figure 5:
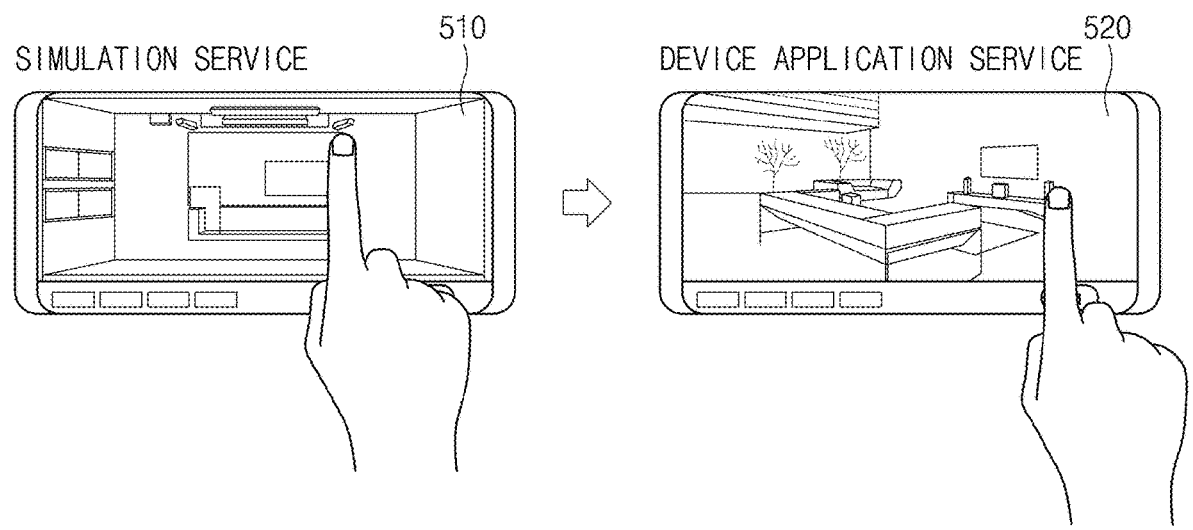
FIG. 5 is a view illustrating a UI screen of an electronic device in the case where a plurality of devices are a plurality of speakers, according to an embodiment.

FIG. 5 is a view illustrating a UI screen of an electronic device (e.g., the electronic device 110 of FIG. 1) in the case where a plurality of devices are a plurality of speakers, according to an embodiment. The plurality of speakers may include a recommendation speaker and a retained speaker.

Referring to FIG. 5, in a virtual environment image 510, when editing the specified virtual environment image based on the virtual environment information entered through an input module (e.g., the input module 112 of FIG. 3), a processor (e.g., the processor 116 of FIG. 3) may configure a virtual environment image (or a virtual environment). For example, the processor 116 may retrieve a virtual environment image stored in a memory (e.g., the memory 115 of FIG. 3). When a user enters virtual environment information through the input module 112, the processor 116 may edit the space size, background color, user location, each device location, obstacle location (e.g., a table, a sofa, or the like) of elements displayed within the virtual environment based on the entered virtual environment information, and thus may configure or customize the virtual environment represented in the image. The processor 116 may verify virtual environment information based on a user input using a virtual environment image 510. For example, when the user touches and drags each speaker (e.g., recommendation speaker) within the virtual environment image 510, and then releases the touch, the processor 116 may verify location information (virtual device information) of each device as indicated by the final location of each speaker.

The processor 116 may determine for simulation reverb settings or signal interference ratio settings associated with each speaker, based on the location information of each speaker. For example, the reverb settings may include at least one of a reverberation time, a pre-delay between an output sound and the first reverberation sound, the size of a space, a trail level, an early reflection level, spread, low cut, high cut, or the type of a space (e.g., a room).

In an embodiment, the processor 116 may determine user preference information based on at least one of information about each speaker location or a user input (e.g., an input associated with the setting value) on the virtual environment image 510 and may determine the setting value of the recommendation speaker further based on preference information. For example, the processor 116 may determine that the user prefers emphasis on a higher tones where the speaker outputting the high tone is disposed close to the user. The processor 116 may determine the setting value (e.g., an equalizer setting, a sound effect, or the like) associated with a speaker so as to emphasize the higher tones.

In the real environment image 520, when the recommendation speaker is installed in the real environment, the processor 116 may verify a difference between the virtual environment and the real environment based on the real environment image 520 or the like. When verifying the difference between the virtual environment and the real environment, the processor 116 may correct the setting value of the recommendation speaker so as to reduce a change in an output due to the verified difference, and thus may determine the setting value (optimal value) corresponding to the real environment. For example, the space size of the real environment may be greater than the space size set in the virtual environment. Furthermore, the setting value of the recommendation speaker may include a first equalizer setting for emphasizing the high tone. For example, the first equalizer setting may include a setting for increasing the volume of 1 kHz area by 5 dB. In this case, the processor 116 may change the first equalizer setting of the recommendation speaker so as to correspond to the increased space of the real environment. In this case, as the high tone of the changed first equalizer setting more increases, the changed first equalizer setting may include a setting for increasing the volume of 1 kHz area by 7 dB.

Figure 6:
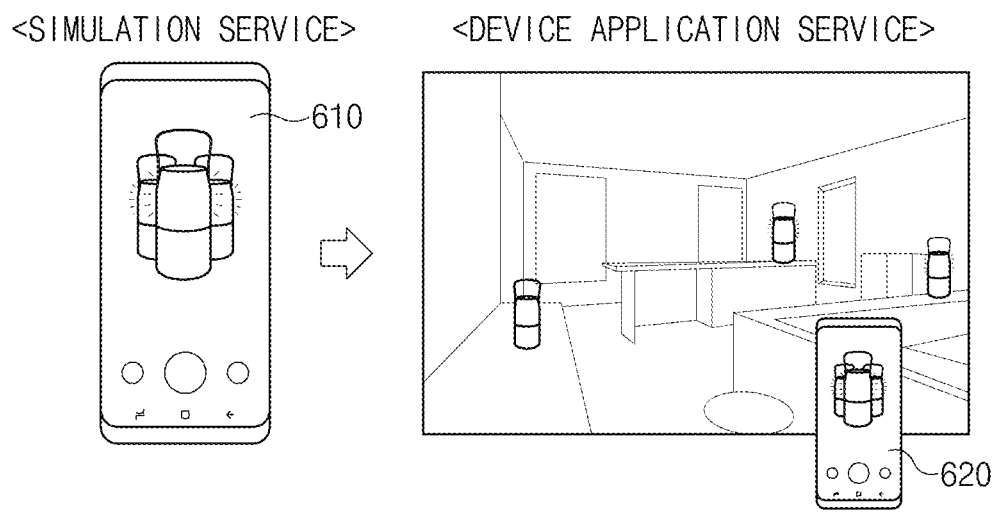
FIG. 6 is a view illustrating a UI screen of an electronic device in the case where a plurality of devices are three lighting fixtures, according to an embodiment.

FIG. 6 is a view illustrating a UI screen of an electronic device (e.g., the electronic device 110 of FIG. 1) in the case where a plurality of devices are three lighting fixtures, according to an embodiment. For example, three lighting fixtures may be recommendation lighting fixtures.

As illustrated in an image 610, a user may select three lighting fixtures as the recommended devices by using the simulation service of the electronic device 110 and may enter a color combination associated with the selected three lighting fixtures as virtual environment information (or virtual device information). If the user does not additionally enter the virtual environment information (e.g., a background color) for applying three lighting fixtures, the processor 116 may determine that the entered color combination is the setting value and may store default environment information and service history information including the entered color combination.

As illustrated in an image 620, after the purchase of three lighting fixtures, the user may enter real environment information associated with the real environment through an input module (e.g., the input module 112 of FIG. 3). For example, the real environment information may include a space size, the location of each lighting fixture, a lighting direction, or the like. In this case, the processor (e.g., the processor 116 of FIG. 3) may compare the default environment information with the entered real environment information and may determine (or re-determine) the setting value (e.g., at least one of a lighting illumination, a lighting color, a device location, or a lighting direction) associated with the output of each lighting fixture corresponding to the output of each of three lighting fixtures, based on the comparison result. For example, when a peripheral color (e.g., a wallpaper color) according to the default environment information is white and the peripheral color of the real environment is red, the processor 116 may determine the color information (the setting value) of each lighting fixture in terms of its capacity to further emphasize (or deemphasize) a red color. When the user selects a lighting fixture for which a setting is to be changed (such as by a touch input selection) from among a number of display images representing the plurality of lighting fixtures, the processor 116 may provide an interface for changing the setting value determined with respect to the touched lighting fixture. Additionally, the processor 116 may output the output example images of a plurality of lighting fixtures corresponding to the determined setting value, on the display 114.

Figure 7:
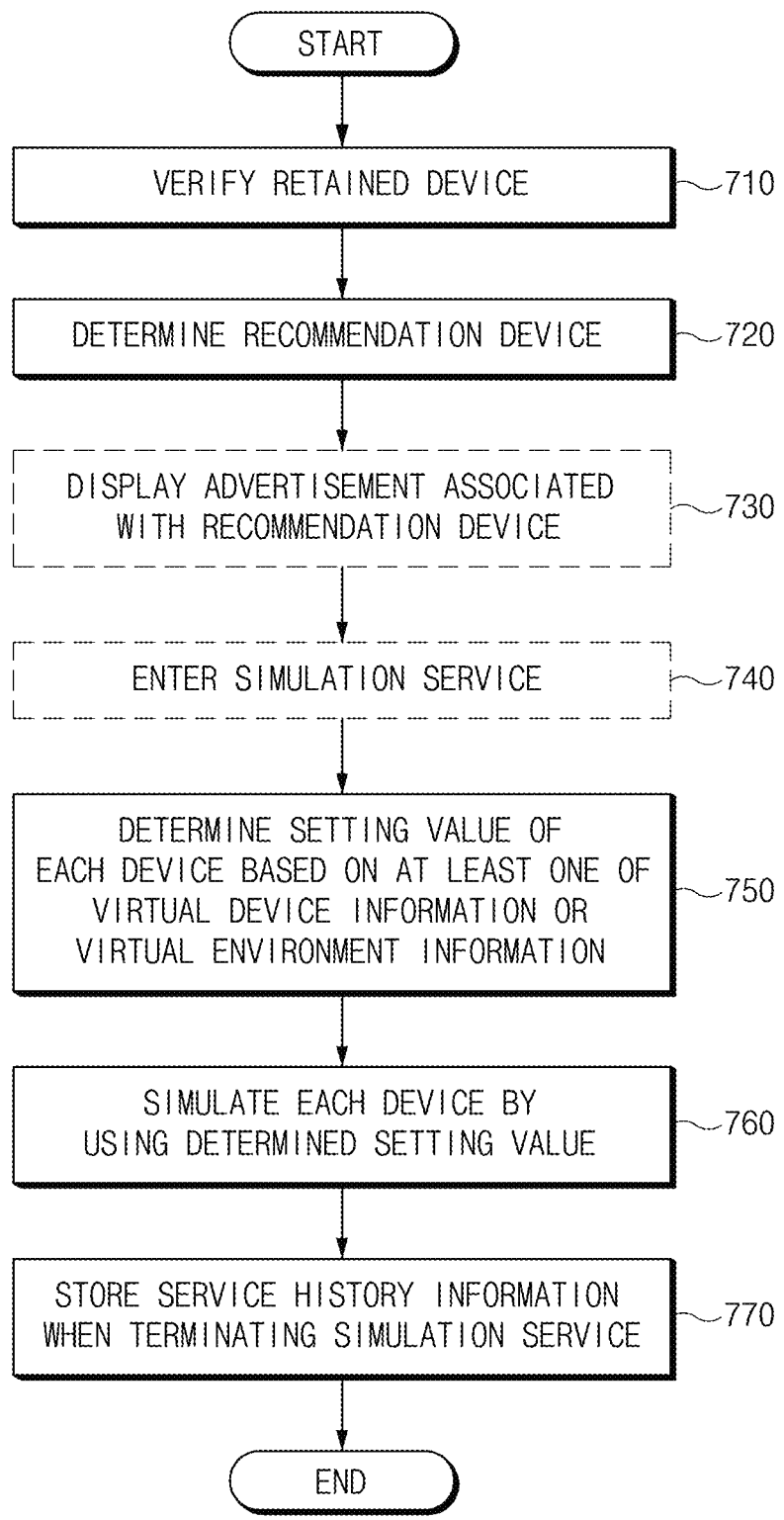
FIG. 7 is a flowchart illustrating a method of determining a device setting value, according to an embodiment.

FIG. 7 is a flowchart illustrating a method of determining a device setting value, according to an embodiment. For example, when verifying a user input through an advertisement platform (e.g., the specified application or the specified web), a processor (e.g., the processor 116 of FIG. 3) may determine the device setting value. For example, the specified application (or the specified web) may be an application (or a web) that provides a service to sale or simulate a device.

Referring to FIG. 7, in operation 710, the processor 116 may verify the retained device, which is possessed by the user or which is scheduled to be possessed. For example, the processor 116 may verify the retained device based on connection history information.

In operation 720, the processor 116 may determine at least one recommended device, which is to be recommended to the user, from among a plurality of devices being sold. For example, the processor 116 may determine the recommended device based on at least one of retained device list information, device correlation information, priority information, or user preference information.

In operation 730, the processor 116 may display an advertisement associated with the determined recommended device. For example, the processor 116 may display an informational summary (e.g., a function or an image) for the determined recommended device, or the like. It is noted that in some embodiments operation 730 may be omitted.

In operation 740, the processor 116 may enter a simulation service associated with one of the determined recommended devices. For example, when one of the determined recommended devices is selected, the processor 116 may enter the simulation service associated with the selected recommended device.

In operation 750, the processor 116 may determine the setting value (i.e., a configuration) of each device based on at least one of a combination of outputs of devices or environment information. In operation 750, the processor 116 may determine the setting value of each device further based on the specified output mode. For example, in the case where the retained device that will interoperate with the recommended device is present, the processor 116 may determine the setting value of at least one device based on the environment information and the combination of outputs of devices. For another example, in the case where the retained device is absent, the processor 116 may verify a target setting value associated with the output of the recommended device in a specified mode and may determine the setting value of the recommended device such that the output of the recommended device corresponds to the target setting value according to environment information.

In operation 760, the processor 116 may simulate the output of each device by using the setting value of each device. For example, in an example involving a plurality of lighting fixtures, the processor 116 may output the output lighting of each of the plurality of lighting fixtures by using the display 114, with colors and illumination set according to the setting value of each device.

In operation 770, when the simulation service ends, the processor 116 may store service history information. For example, when the termination of the simulation service is requested, the processor 116 may store the service history information. For example, the service history information may include at least one of service identification information, virtual environment information, the recommended device, installation information of each device, or the setting value of each device. For another example, the service history information may include at least one of connection history information, virtual environment information, information about each virtual device, a setting value of each device, or a virtual environment image.

An embodiment in FIG. 7 is exemplified as the simulation service is operation 740 to operation 770. However, alternatively, at least part of operation 710 to operation 730 may be included in the simulation service. Various operations in the flowchart of FIG. 7 may be performed in order illustrated in FIG. 7, may be performed in another order, or may be performed at the same time. In addition, in a part of embodiments, a part of operations, blocks, operations, or the like may be variously changed (e.g., omitted, added, revised, or skipped) without departing from the disclosed embodiments.

Figure 8:
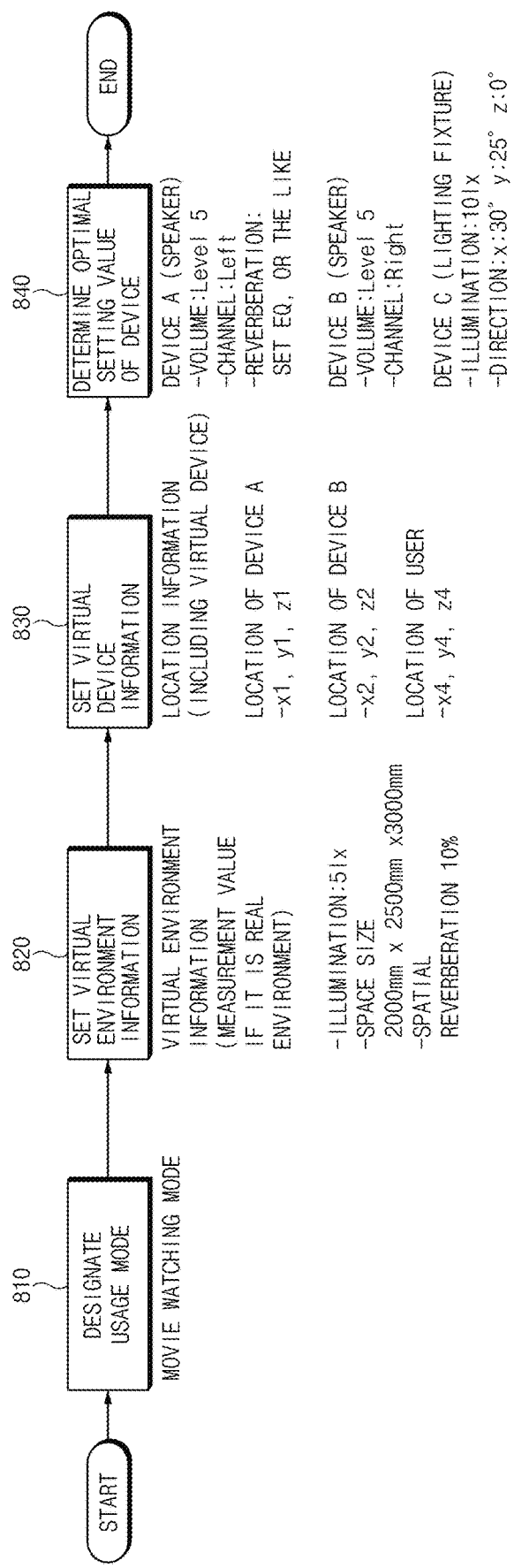
FIG. 8 is a flowchart illustrating a method of determining an optimal setting value with respect to a plurality of devices, according to an embodiment.

FIG. 8 is a flowchart illustrating a method of determining an optimal setting value with respect to a plurality of devices, according to an embodiment. An embodiment is exemplified in FIG. 8 as the optimal setting value of each device is determined in the case where each of device A and device B is a speaker and device C is a lighting fixture.

Referring to FIG. 8, in operation 810, when a user designates a particular usage (or "output") mode for a simulated environment (such as a 'movie watching' mode) through an input module (e.g., the input module 112 of FIG. 3), the processor 116 may verify a specified output mode. For example, the specified output mode may be selected from a list including a plurality of predetermined output modes.

In operation 820, when the user sets virtual environment information for configuring an virtual environment, in which devices are to be applied, by using at least one of the input module 112 or a sensor module (e.g., the sensor module 113 of FIG. 3), a processor (e.g., the processor 116 of FIG. 3) may verify the set virtual environment information. For example, the virtual environment information may include information about the illumination (e.g., 5 lux) of a space, information about a space size (e.g., 2000 mm×2500 mm×3000 mm), or information about spatial acoustic reverberation (e.g., 10%). For example, the processor 116 may verify the virtual environment information entered by the user, by using the input module 112. For another example, the processor 116 may sense at least one of illumination or spatial acoustic reverberation, associated with a real environment in which a product of device is to be installed, by using the sensor module 113 and may verify the virtual environment information based on the sensed information.

In operation 830, when the user sets the virtual device information using at least one of the input module 112 or the sensor module 113, the processor 116 may verify the set location information. For example, the virtual device information may include at least one of each device location or a user location. For example, when verifying depth information corresponding to the location of the retained device from an image obtained by capturing the real environment by using a camera, the processor 116 may verify a distance between the user location (e.g., a vantage point of the camera-captured image) and the device. For another example, the processor 116 may configure a virtual environment image using the image obtained by capturing the real environment, may display the virtual environment image, and may verify location information of the recommended device based on the arrangement location of the recommended device within the virtual environment image. For another example, the processor 116 may verify at least a set coordinates $(x_i, y_i, z_i)$ (in which 'i' is a natural number of 4 or less) (i.e., coordinated-based location information) of a user location or a device location associated with the virtual environment, based on a coordinate value designating a location using a GPS module.

In operation 840, the processor 116 may determine the setting value (optimal value) of a device in the requested mode based on virtual environment information and location information. For example, the processor 116 may verify that a target setting value of a volume is level 10 in the movie watching mode and may determine the volume of each of device A (speaker) and device B (speaker) is level 5. Since two speakers are present, the processor 116 may set a channel to a "stereo" channel. In the case where device A is a left speaker, the processor 116 may allocate a left channel to device A; in the case where device B is a right speaker, the processor 116 may allocate a right channel to device B. For another example of the movie watching mode, the processor 116 may verify that a target illumination value is 10 lux, a target color value is 'F3F0F1' (HEXA, RGB), and a target lighting direction is (30°, 25°, 0°) in the movie watching mode, and may verify that there is one lighting fixture. As such, the processor 116 may determine that the illumination value of device C associated with the movie watching mode is 10 lux, may determine that a color is 'F3F0F1', and that a lighting direction is (30°, 25°, 0°).

Various operations in the flowchart of FIG. 8 may be performed in order illustrated in FIG. 8, may be performed in another order, or may be performed at the same time. In addition, in a part of embodiments, a part of operations, blocks, operations, or the like may be variously changed (e.g., omitted, added, revised, or skipped) without departing from the disclosed embodiments.

Figure 9:
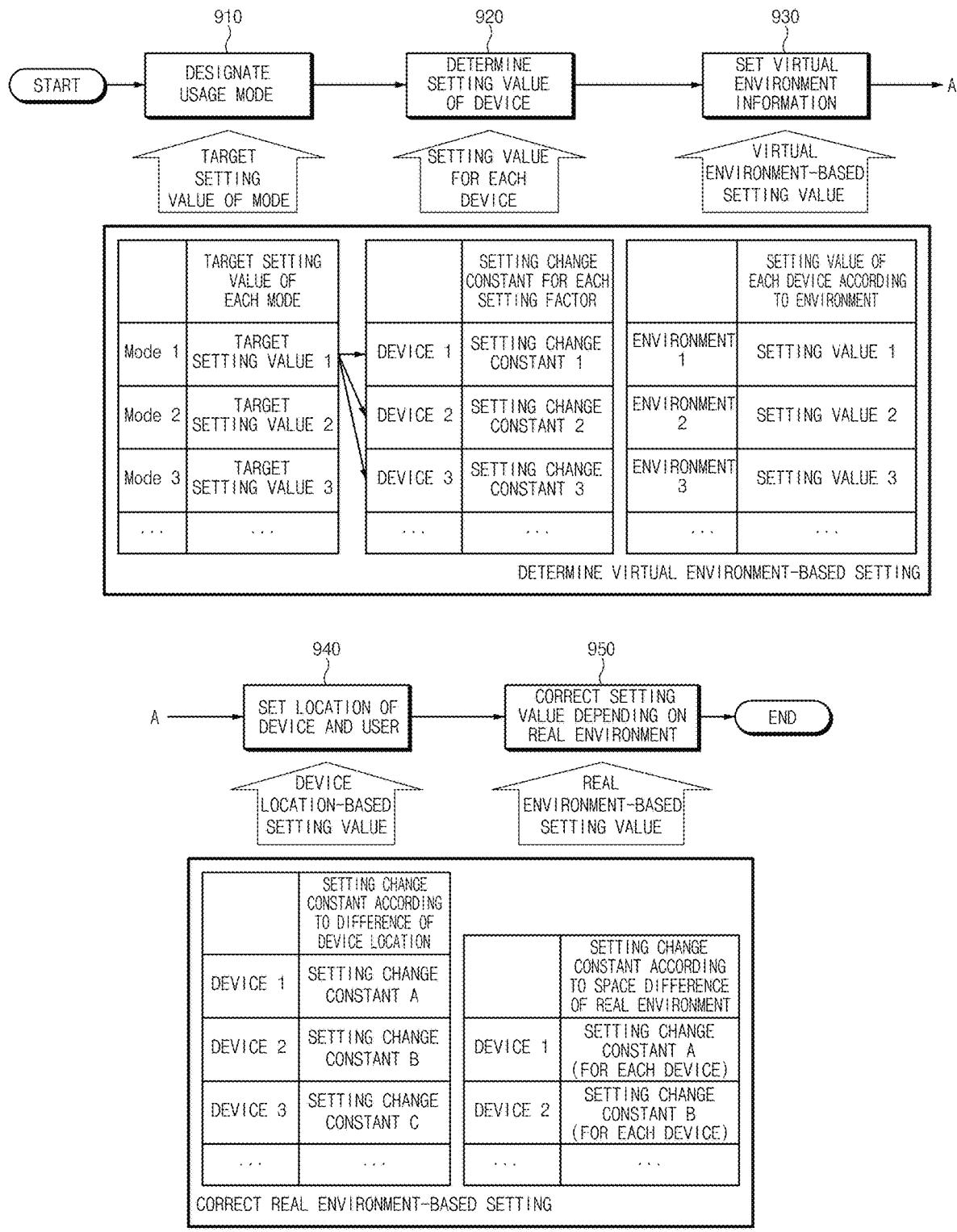
FIG. 9 is a flowchart for describing a setting value determining method of a device, according to an embodiment.

FIG. 9 is a flowchart for describing a setting value determining method of a device, according to an embodiment.

Referring to FIG. 9, in operation 910, when a user designates a usage mode (i.e., an output mode) through an input module (e.g., the input module 112 of FIG. 3), the processor 116 may verify a specified output mode and may determine a target setting value associated with each output of a recommended device in a specified mode. For example, the output mode may include at least one of a mode provided by default by the recommended device or a mode added by the user. For example, the output mode may include at least one of a "movie" mode, a "relax" mode, a "concentration" mode, or a "sports" mode. For example, in the case where the device is an air conditioner, the output mode may include at least one of, for example, a smart comfort mode (or an automatic mode), a cooling mode, a dehumidification mode, or an air cleaning mode. The target setting value may be set based on environment information about a default environment. For example, in the target setting value associated with a sound output in the movie watching mode, the specific settings may include a volume level (e.g., 10), a first equalizer setting (e.g., bass 8, mid 4, treble 6), a first acoustic reverberation setting (e.g., reverb 20%), an audio channel setting (e.g., 5.1 channel mode), or the like. In the movie watching mode, target setting value may be utilized associated with a lighting, such as a lighting illumination level which may be set to "2" and a lighting direction which may be set as x; 90°, y;0°, z; 0°, or the like.

When the retained device and the recommended device, which are to be used in a specified output mode, are verified, in operation 920, the processor 116 may determine a setting change constant associated with a setting factor (e.g., a volume of a sound output, an equalizer, a sound effect, or the like) of the output of each device, which allows the sum of setting values associated with outputs of devices to be the target setting value. For example, as illustrated in Equation 1, the setting change constant of each setting factor may be a result obtained by dividing the setting value of the setting factor of each device by the target setting value. In Equation 1, for example, the setting value of each device may be a result obtained by dividing the target setting value by the number of devices.

$$\frac{\text{setting value of each device}}{\text{target setting value}} = \text{setting change constant} \quad \text{[Equation 1]}$$

For example, in the case where each device is a speaker device, the target setting value may include a target volume value and the number of target channels. In this case, the volume value of each speaker may be a value obtained by dividing the target volume value by the number of speakers. In the case where the number of channels corresponding to the target setting value is greater than the number of speakers, the channel of each speaker may be set to blend channels (e.g., so as to reduce the number of channels) in accordance with the number of speakers. Alternatively, in the case where the number of target channels is less than the total number of speakers, sounds of peripheral speakers may be blended and output with respect to a spare speaker. For another example, in the case where each device is a lighting fixture, the target setting value may include a target illumination value and an illumination direction. In this case, the illumination of each lighting fixture may be a value obtained by dividing the target illumination value by the number of lighting fixtures. The illumination direction of each lighting fixture may be determined as a vector obtained by summing vectors of illumination directions of a plurality of lighting fixtures.

When the virtual environment information is set in the virtual environment, in operation 930, the processor 116 may determine the setting value of each device based on the virtual environment information. For example, the processor 116 may determine the setting value (e.g., the product of the target setting value and the setting change constant) of each device so as to increase or decrease the setting value of each device by the difference between the space size according to a default environment and the space size according to virtual environment information. For another example, in the case where the space size according to the default environment is a medium size room and the space size according to the virtual environment information is a small size room, the processor 116 may adjust the volume of the sound output by −20%, may adjust reverberation by +5%, and may adjust a first equalizer setting (e.g., mid −5%, treble −10%). The processor 116 may adjust the illumination of the lighting output by −20%. For another example, the processor 116 may determine the setting value of each device based on at least one of a user location or a device location according to the virtual environment information.

When at least one of user location information or information about each device location is set, in operation 940, the processor 116 may correct the setting value of each device so as to correspond to the set location information. For example, in the case where a device is a TV, the processor 116 may adjust the setting volume, which is determined in operation 930, by −5% and may adjust the screen brightness, which is determined in operation 930, by −3%, when the distance of z-axis between the TV and the user is changed by +30 cm as compared with the default environment. For another example, in the case where the device is a speaker device, the processor 116 may adjust the volume by −5%, may adjust the first equalizer setting, which is determined in operation 930, (e.g., treble −5%, mid −3%), and may adjust reverb, which is determined in operation 930, by +3%, when the distance of z-axis between the speaker device and the user is changed by +30 cm as compared with the default environment. When the distance of x-axis between the speaker device and the user is changed by +30 cm as compared with the default environment, the processor 116 may adjust a panning effect, which is determined in operation 930, by +10%. The panning effect may be channel blending according to a location associated with a multi-channel sound. For another example, in the case where the device is a lighting fixture, the processor 116 may adjust the illumination, which is determined in operation 930, by +5%, when the distance of z-axis between the lighting fixture and the user is changed by +30 cm. For another example, the processor 116 may correct the setting value by multiplying the setting value, which is determined in operation 930, by the setting change constant corresponding to a change in the speaker location difference (x, y, z) between the default environment and the real environment. In particular, in the case where the device is a 4-channel speaker device, the location of a speaker device of channel 1 may be changed to be close to channel 2 and channel 3. In this case, the processor 116 may mix the sound signal of channel 1 with the sound signal of channel 2 and the sound signal of channel 3 to output the mixed sound signal as the sound of channel 1, by the amount that the speaker device of channel 2 and the speaker device of channel 3 are affected by the change in the location of the speaker device of channel 1. When the location of the speaker device of each channel is changed, the amount that sound signals between speaker devices of channels close to the speaker device of each channel are mixed may be determined by an experiment.

In operation 950, the processor 116 may correct the setting change constant (or the setting value of each device) of each device so as to correspond to real environment information according to the real environment. For example, in the case where the device is a TV, when the space size is changed by +20 cm$^2$ as compared with the default environment, the processor 116 may adjust the volume by +5%, may adjust the screen brightness by +3%, and may adjust the first equalizer setting (e.g., treble+5%, mid+3%, or the like). For another example, in the case where the device is a speaker device, when the space size is changed by +20 cm$^2$ as compared with the default environment (or virtual environment), the processor 116 may adjust the volume by +5% and may adjust the first equalizer setting (e.g., treble+5%, mid+ 3%). Moreover, when the spatial reverberation of the real environment is changed by +5% as compared with the default environment (or virtual environment), the processor 116 may adjust the reverb by −5%. For another example, in the case where the device is a lighting fixture, the processor 116 may adjust the illumination by −5% when the space size of the real environment is changed by +20 cm as compared with the default environment (or virtual environment) and may determine the lighting color based on the difference of the RGB value of a color so as to correspond to the background color when the background color of the real environment is changed as compared with the default environment (or virtual environment). When the background color of the default environment (or virtual environment) is white and the background color of the real environment is blue, the processor 116 may change the lighting color by using the result obtained by multiplying the difference of the RGB value of the lighting color by the setting value of the lighting color.

Various operations in the flowchart of FIG. 9 may be performed in order illustrated in FIG. 9, may be performed in another order, or may be performed at the same time. In addition, in a part of embodiments, a part of operations, blocks, operations, or the like may be variously changed (e.g., omitted, added, revised, or skipped) without departing from the disclosed embodiments.

Figure 10:
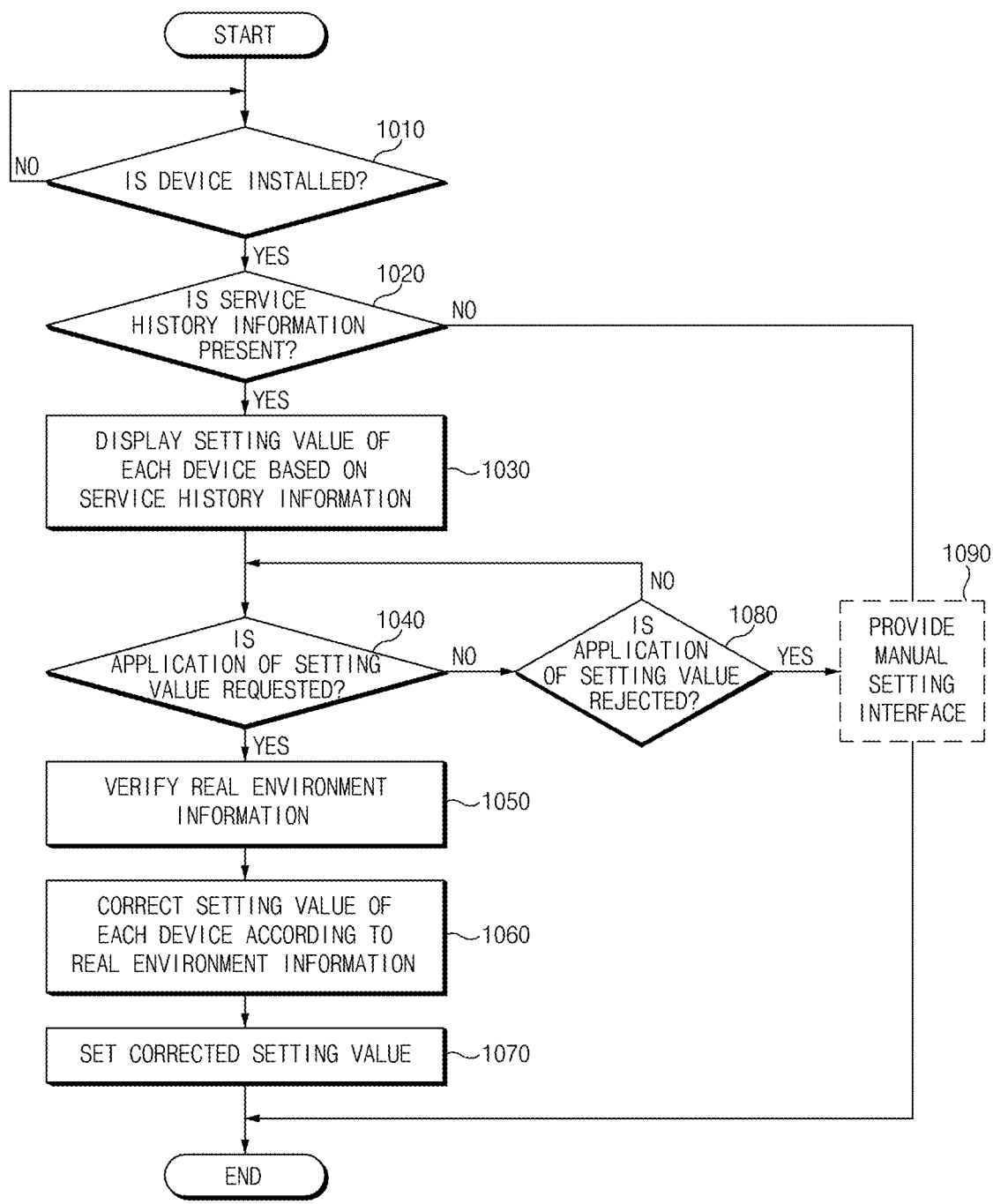
FIG. 10 is a flowchart illustrating a method of applying a device setting value, according to an embodiment.

FIG. 10 is a flowchart illustrating a method of applying a device setting value, according to an embodiment. For example, the processor 116 may apply device settings through a specified application or a specified web (e.g., advertisement platform).

Referring to FIG. 10, in operation 1010, a processor (e.g., the processor 116 of FIG. 3) may determine whether a new device is installed (or connected) in a real environment. For example, when verifying device information (e.g., device identification information) by communicating with a device through the communication module 111 in response to a user input, the processor 116 may verify that the device is installed in the real environment. For another example, the processor 116 may periodically determine whether a new device is installed in the real environment, through the communication module 111 and may verify that the new device is installed, based on the determination result. For another example, when verifying a device image stored in a memory (e.g., the memory 115 of FIG. 3) from a real environment image captured by using a camera, the processor 116 may communicate with a device through the communication module 111 to verify that the device is installed.

In operation 1020, the processor 116 may determine whether service history information corresponding to at least one of the real environment image, connection history information, or the verified device information is present. For example, the processor 116 may search for the service history information corresponding to the connection history information or the verified device information from the memory 115. For another example, when comparing the real environment image captured by using the camera with the real environment image corresponding to the service history information, the processor 116 may verify the service history information corresponding to the real environment image.

When the verified service history information is present, in operation 1030, the processor 116 may display the setting value of one or more devices installed within the environment. For example, the processor 116 may display at least part of the setting value associated with the output of at least one device. For another example, when the service history information is present and when the setting value of the new device is present, the processor 116 may display setting value of the new device on the display 114.

In operation 1040, the processor 116 may determine whether the application of the setting value of each device is requested. For example, the processor 116 may determine whether a user input is received requesting application of the setting value of one or more devices.

In operation 1050, when the application of the setting value is requested, the processor 116 may verify real environment information associated with the real environment. For example, the processor 116 may verify at least one of the peripheral color of the real environment, a user location, each device location, or obstacle information, based on the real environment image obtained by capturing the real environment. For another example, the processor 116 may sense at least one of the illumination, temperature, or humidity of the real environment, by using a passive element (e.g., the sensor module 113 of FIG. 3). For another example, when transmitting a signal to a speaker and receiving a signal by using a microphone, the processor 116 may sense at least one of a user location, each device location, each device location associated with the user, or spatial reverberation.

In operation 1060, the processor 116 may correct the setting value of each device so as to correspond to real environment information according to the real environment. For example, the processor 116 may correct (or change) the determined setting value of each device based on the virtual environment information according to the virtual environment so as to correspond to environment information according to the real environment.

In operation 1070, the processor 116 may set the corrected setting value of each device with respect to each device. For example, the processor 116 may transmit the corrected setting value of each device to each device by using the communication module 111. The respective device may receive the setting value of each device and may set the output of each device so as to correspond to the received setting value.

In operation 1020, when the processor 116 verifies that service history information is absent, or in operation 1080, when a user input to reject the application of the setting value is received, in operation 1090, the processor 116 may provide an interface for manually setting the setting value of each device. Operation 1090 may be skipped.

Various operations in the flowchart of FIG. 10 may be performed in order illustrated in FIG. 10, may be performed in another order, or may be performed at the same time. In addition, in a part of embodiments, a part of operations, blocks, operations, or the like may be variously changed (e.g., omitted, added, revised, or skipped) without departing from the disclosed embodiments.

Figure 11:
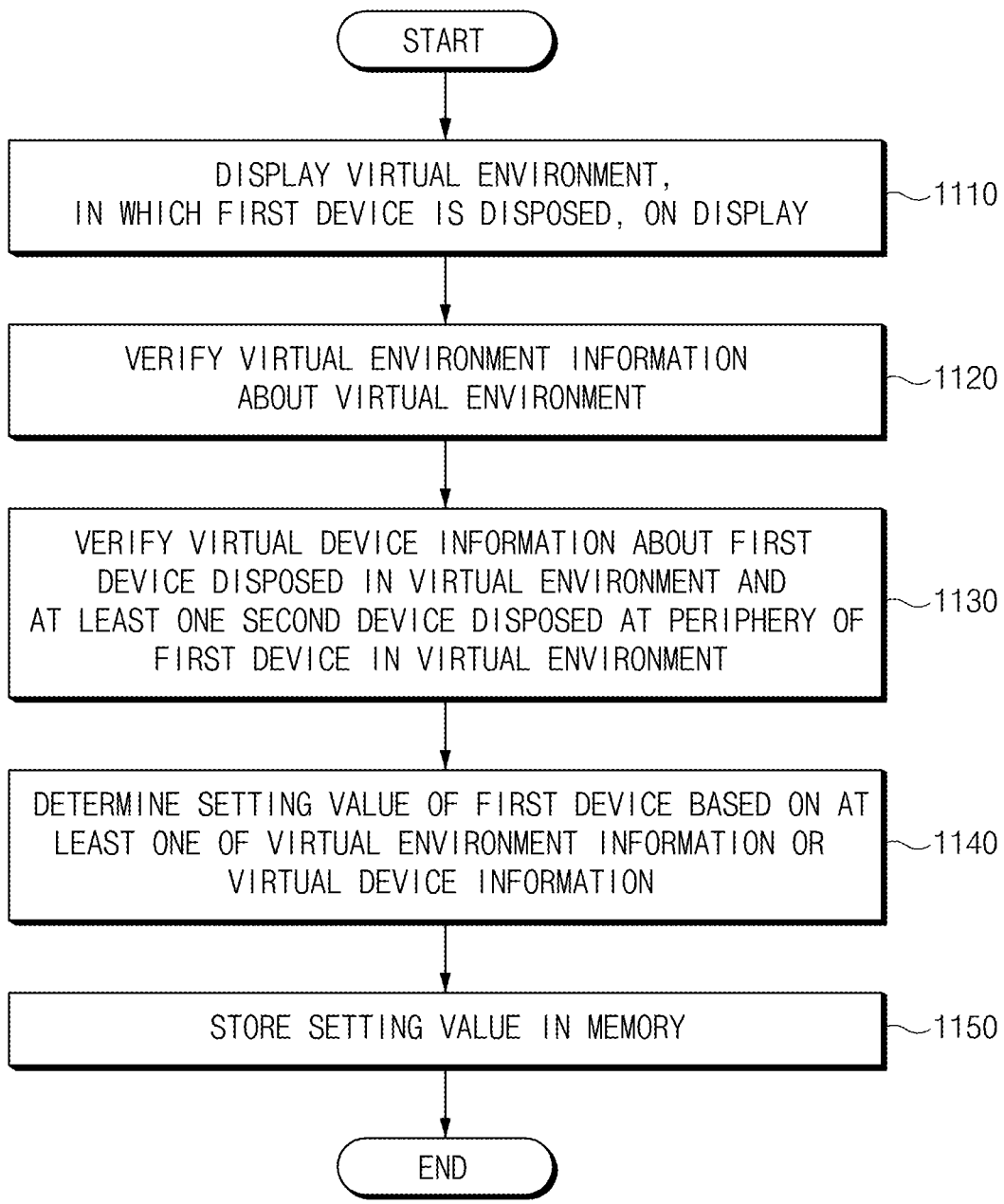
FIG. 11 is a flowchart illustrating an optimal setting value determining method with respect to a device, according to an embodiment.

FIG. 11 is a flowchart illustrating an optimal setting value determining method with respect to a device, according to an embodiment.

Referring to FIG. 11, in operation 1110, a processor (e.g., the processor 116 of FIG. 3) may display a virtual environment, in which a first device (recommended device) is disposed, on a display.

In operation 1120, the processor 116 may verify virtual environment information about the virtual environment.

In operation 1130, the processor 116 may verify the virtual device information about the first device (the recommended device) disposed in the virtual environment and at least one second device (the retained device) disposed at a periphery of the first device in the virtual environment.

In operation 1140, the processor 116 may determine a setting value of the first device based on at least one of the virtual environment information or the virtual device information.

In operation 1150, the processor 116 may store the determined setting value in a memory.

According to an embodiment, a method of controlling an electronic device by at least one processor, the method includes displaying a virtual environment in which a first device is disposed on a display; verifying virtual environment information about the virtual environment; verifying virtual device information about the first device disposed in the virtual environment and at least one second device disposed at a periphery of the first device in the virtual environment; determining a setting value of the first device based on at least one of the virtual environment information or the virtual device information; and storing the determined setting value in a memory.

The virtual environment information includes at least one of space size information of the virtual environment, spatial reverberation information of the virtual environment, peripheral color information of the virtual environment, or obstacle information included in the virtual environment. And the virtual device information includes at least one of location information of the first device, output information of the first device, location information of the at least one second device, output information of the at least one second device, user location information, and distance information between the first device, the at least one second device, and a user.

The method further includes simulating an output of the first device on the virtual environment so as to correspond to the determined setting value.

The method further includes when the first device is installed in a real environment, transmitting the stored setting value to the first device.

The method further includes when the first device is installed in a real environment, verifying real environment information about the real environment in which the first device is installed; correcting the stored setting value based on the real environment information; and transmitting the corrected setting value to the first device.

The method further includes verifying real device information about the first device disposed in a real environment and the at least one second device disposed at a periphery of the first device in the real environment; correcting the stored setting value based on the real device information; and transmitting the corrected setting value to the first device.

Figure 12:
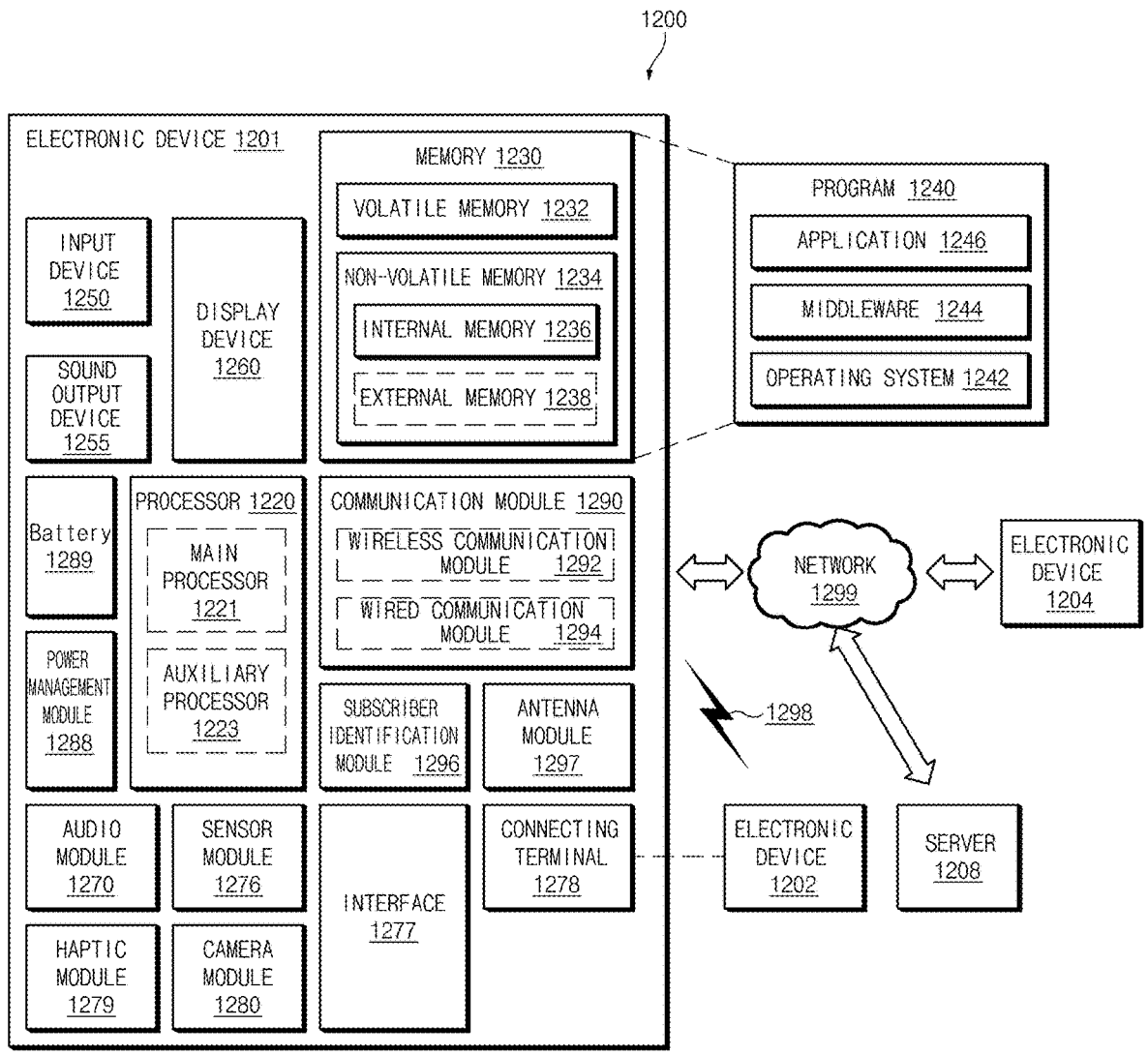
FIG. 12 is a block diagram of an electronic device 1201 in a network environment 1200 according to various embodiments.

FIG. 12 is a block diagram of an electronic device 1201 in a network environment 1200 according to various embodiments. Referring to FIG. 12, the electronic device 1201 (e.g., the electronic device 110 of FIG. 1) may communicate with an electronic device 1202 through a first network 1298 (e.g., a short-range wireless communication) or may communicate with an electronic device 1204 or a server 1208 through a second network 1299 (e.g., a long-distance wireless communication) in the network environment 1200. According to an embodiment, the electronic device 1201 may communicate with the electronic device 1204 through the server 1208. According to an embodiment, the electronic device 1201 may include a processor 1220 (e.g., the processor 116 of FIG. 3), a memory 1230 (e.g., the memory 115 of FIG. 3), an input device 1250 (e.g., the input module 112 of FIG. 3), a sound output device 1255, a display device 1260 (e.g., the display 114 of FIG. 3), an audio module 1270, a sensor module 1276, an interface 1277, a haptic module 1279, a camera module 1280 (e.g., the sensor module 113 of FIG. 3), a power management module 1288, a battery 1289, a communication module 1290 (e.g., the communication module 111 of FIG. 3), a subscriber identification module 1296, and an antenna module 1297. According to some embodiments, at least one (e.g., the display device 1260 or the camera module 1280) among components of the electronic device 1201 may be omitted or other components may be added to the electronic device 1201. According to some embodiments, some components may be integrated and implemented as in the case of the sensor module 1276 (e.g., a fingerprint sensor, an iris sensor, or an illuminance sensor) embedded in the display device 1260 (e.g., a display).

The processor 1220 may operate, for example, software (e.g., a program 1240) to control at least one of other components (e.g., a hardware or software element) of the electronic device 1201 connected to the processor 1220 and may process and compute a variety of data. The processor 1220 may load a command set or data, which is received from other components (e.g., the sensor module 1276 or the communication module 1290), into a volatile memory 1232, may process the loaded command or data, and may store result data into a nonvolatile memory 1334. According to an embodiment, the processor 1220 may include a main processor 1221 (e.g., a central processing unit or an application processor) and a co-processor 1323 (e.g., a graphic processing device, an image signal processor, a sensor hub processor, or a communication processor), which operates independently from the main processor 1221, additionally or alternatively uses less power than the main processor 1221, or is specified to a designated function. In this case, the coprocessor 1323 may operate separately from the main processor 1221 or embedded.

In this case, the coprocessor 1223 may control, for example, at least some of functions or states associated with at least one component (e.g., the display device 1260, the sensor module 1276, or the communication module 1290) among the components of the electronic device 1201 instead of the main processor 1221 while the main processor 1221 is in an inactive (e.g., sleep) state or together with the main processor 1221 while the main processor 1221 is in an active (e.g., an application execution) state. According to an embodiment, the coprocessor 1323 (e.g., the image signal processor or the communication processor) may be implemented as a part of another component (e.g., the camera module 1280 or the communication module 1290) that is functionally related to the coprocessor 1323. The memory 1230 may store a variety of data used by at least one component (e.g., the processor 1220 or the sensor module 1276) of the electronic device 1201, for example, software (e.g., the program 1240) and input data or output data with respect to one or more instructions associated with the software. The memory 1230 may include the volatile memory 1232 or the nonvolatile memory 1234.

The program 1240 may be stored in the memory 1230 as software and may include, for example, an operating system 1242, a middleware 1244, or an application 1246.

The input device 1250 may be a device for receiving a command or data, which is used for a component (e.g., the processor 1220) of the electronic device 1201, from an outside (e.g., a user) of the electronic device 1201 and may include, for example, a microphone, a mouse, or a keyboard.

The sound output device 1255 may be a device for outputting a sound signal to the outside of the electronic device 1201 and may include, for example, a speaker used for general purposes, such as multimedia play or recordings play, and a receiver used for receiving calls. According to an embodiment, the receiver and the speaker may be either integrally or separately implemented.

The display device 1260 may be a device for visually presenting information to the user and may include, for example, a display, a hologram device, or a projector and a control circuit for controlling a corresponding device. According to an embodiment, the display device 1260 may include a touch circuitry or a pressure sensor for measuring an intensity of pressure on the touch.

The audio module 1270 may convert a sound and an electrical signal in dual directions. According to an embodiment, the audio module 1270 may obtain the sound through the input device 1250 or may output the sound through an external electronic device (e.g., the electronic device 1202 (e.g., a speaker or a headphone)) wired or wirelessly connected to the sound output device 1255 or the electronic device 1201.

The sensor module 1276 may generate an electrical signal or a data value corresponding to an operating state (e.g., power or temperature) inside or an environmental state outside the electronic device 1201. The sensor module 1276 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1277 may support a designated protocol wired or wirelessly connected to the external electronic device (e.g., the electronic device 1202). According to an embodiment, the interface 1277 may include, for example, an HDMI (high-definition multimedia interface), a USB (universal serial bus) interface, an SD card interface, or an audio interface.

A connection terminal 1278 may include a connector that physically connects the electronic device 1201 to the external electronic device (e.g., the electronic device 1202), for example, an HDMI connector, a USB connector, an SD card connector, or an audio connector (e.g., a headphone connector).

The haptic module 1279 may convert an electrical signal to a mechanical stimulation (e.g., vibration or movement) or an electrical stimulation perceived by the user through tactile or kinesthetic sensations. The haptic module 1279 may include, for example, a motor, a piezoelectric device, or an electric stimulator.

The camera module 1280 may shoot a still image or a video image. According to an embodiment, the camera module 1280 may include, for example, at least one lens, an image sensor, an image signal processor, or a flash.

The power management module 1288 may be a module for managing power supplied to the electronic device 1201 and may serve as at least a part of a power management integrated circuit (PMIC).

The battery 1289 may be a device for supplying power to at least one component of the electronic device 1201 and may include, for example, a non-rechargeable (primary) battery, a rechargeable (secondary) battery, or a fuel cell.

The communication module 1290 may establish a wired or wireless communication channel between the electronic device 1201 and the external electronic device (e.g., the electronic device 1202, the electronic device 1204, or the server 1208) and support communication execution through the established communication channel. The communication module 1290 may include at least one communication processor operating independently from the processor 1220 (e.g., the application processor) and supporting the wired communication or the wireless communication. According to an embodiment, the communication module 1290 may include a wireless communication module 1292 (e.g., a cellular communication module, a short-range wireless communication module, or a GNSS (global navigation satellite system) communication module) or a wired communication module 1294 (e.g., an LAN (local area network) communication module or a power line communication module) and may communicate with the external electronic device using a corresponding communication module among them through the first network 1298 (e.g., the short-range communication network such as a Bluetooth, a WiFi direct, or an IrDA (infrared data association)) or the second network 1299 (e.g., the long-distance wireless communication network such as a cellular network, an internet, or a computer network (e.g., LAN or WAN)). The above-mentioned various communication modules 1290 may be implemented into one chip or into separate chips, respectively.

According to an embodiment, the wireless communication module 1292 may identify and authenticate the electronic device 1201 using user information stored in the subscriber identification module 1296 in the communication network.

The antenna module 1297 may include one or more antennas to transmit or receive the signal or power to or from an external source. According to an embodiment, the communication module 1290 (e.g., the wireless communication module 1292) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1201 and the external electronic device 1204 through the server 1208 connected to the second network 1299. Each of the electronic devices 1202 and 1204 may be the same or different types as or from the electronic device 1201. According to an embodiment, all or some of the operations performed by the electronic device 1201 may be performed by another electronic device or a plurality of external electronic devices. When the electronic device 1201 performs some functions or services automatically or by request, the electronic device 1201 may request the external electronic device to perform at least some of the functions related to the functions or services, in addition to or instead of performing the functions or services by itself. The external electronic device receiving the request may carry out the requested function or the additional function and transmit the result to the electronic device 1201. The electronic device 1201 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1240) including an instruction stored in a machine-readable storage media (e.g., an internal memory 1236 or an external memory 1238) readable by a machine (e.g., a computer). The machine may be a device that calls the instruction from the machine-readable storage media and operates depending on the called instruction and may include the electronic device (e.g., the electronic device 1201). When the instruction is executed by the processor (e.g., the processor 1220), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed exclusively through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
    a display;
    at least one processor;
    a communication circuit; and
    a memory storing programming instructions executable by the at least one processor to cause the electronic device to:
    recommend a virtual first device based on at least one second device, the at least one second device being disposed in a real environment, wherein the virtual first device is recommended for purchase;
    display a virtual environment in which the virtual first device is disposed on the display, the virtual environment simulating the real environment;
    detect virtual environment information about the virtual environment;
    detect virtual device information about the virtual first device disposed in the virtual environment and the at least one second device disposed in the virtual environment;
    determine a first setting value for the virtual first device based on at least one of the virtual environment information and the virtual device information;
    determine a second setting value for the at least one second device based on the first setting value;
    store the determined first setting value and the determined second setting value in the memory;
    detect a real first device; and
    when the real first device is detected as installed in the real environment, transmit the first setting value stored in the memory to the real first device through the communication circuit, the real first device corresponding to the virtual first device.

2. The electronic device of claim 1,
    wherein the virtual environment information includes at least one of:
        space size information of the real environment, spatial acoustic reverberation information of the real environment, color information of the real environment, or obstacle information associated with objects disposed within the real environment, and
    wherein the virtual device information includes at least one of:
        location information indicating a potential placement of the virtual first device in the real environment,
        output information of the virtual first device,
        location information indicating where the at least one second device is disposed within the real environment,
        output information of the at least one second device,
        a user location within the real environment, and
        a distance between the potential placement of the virtual first device, the location of the at least one second device, and the user within the real environment.

3. The electronic device of claim 1, further comprising:
    a camera,
    wherein the processor is configured to:
        display the virtual environment on the display based on an image captured by the camera.

4. The electronic device of claim 1, further comprising:
    an input module including an input circuit,
    wherein the processor is configured to:
        alter the virtual environment displayed on the display, based on an input detected by the input module; and
        redetect the virtual environment information and the virtual device information, based on the altered virtual environment.

5. The electronic device of claim 1,
    wherein the programming instructions are further executable to cause the electronic device to:
        retrieve a target setting value of the virtual first device stored in the memory; and
        configure the first setting value of the virtual first device and the second setting value of the at least one second device based on the virtual device information such that an output of the virtual first device and an output of the at least one second device corresponds to the retrieved target setting value.

6. The electronic device of claim 5, further comprising:
    an input module including an input circuit,
    wherein the programming instructions are further executable to cause the electronic device to set an output mode based on an input received through the input module; and
    wherein the target setting value corresponds to the set output mode.

7. The electronic device of claim 1, wherein the programming instructions are further executable to cause the electronic device to:
    simulate output of the virtual first device within the virtual environment so as to correspond to the determined first setting value.

8. The electronic device of claim 1, wherein the memory further stores user preference information including at least one of a preferred function or a preferred device of a user, and
wherein the first setting value of the virtual first device is further based on the user preference information.

9. The electronic device of claim 1, wherein the determined first setting value is stored in association with the virtual environment information and the virtual device information.

10. The electronic device of claim 1,
wherein the programming instructions are further executable to cause the electronic device to:
detect real environment information for the real environment in which the real first device is installed;
alter the first setting value stored in the memory based on the real environment information; and
transmit the altered first setting value to the real first device using the communication circuit.

11. The electronic device of claim 1,
wherein the programming instructions are further executable to cause the electronic device to:
detect real device information for the real first device disposed in the real environment and the at least one second device in the real environment;
alter the first setting value based on the real device information; and
transmit the altered first setting value to the real first device using the communication circuit.

12. The electronic device of claim 1, further comprising:
a camera,
wherein the programming instructions are further executable to cause the electronic device to:
capture an image of the real environment using the camera; and
verify real environment information based on the captured image, the real environment information including at least one of:
space size information of the real environment,
peripheral color information of the real environment,
obstacle information regarding objects disposed within the real environment,
first location information indicating where the real first device is disposed within the real environment,
second location information indicated where the second device is disposed within the real environment,
a location of a user within the real environment, and
a distance between the real first device, the second device, and the user disposed within the real environment.

13. The electronic device of claim 1,
wherein the programming instructions are further executable to cause the electronic device to:
detect at least one of a date, a time, spatial acoustic reverberation information of the real environment, and a distance between the real first device, the at least one second device, and a user, based on a signal received using the communication circuit.

14. A method in an electronic device, the method comprising:
recommending a virtual first device based on at least one second device, the at least one second device being disposed in a real environment, wherein the virtual first device is recommended for purchase;
displaying a virtual environment in which the virtual first device is disposed on a display, the virtual environment simulating the real environment;
detecting by at least one processor virtual environment information about the virtual environment;
detecting virtual device information about the virtual first device disposed in the virtual environment and the at least one second device disposed in the virtual environment;
determining a first setting value for the virtual first device based on at least one of the virtual environment information and the virtual device information;
determining a second setting value for the at least one second device based on the first setting value;
storing the determined first setting value and the determined second setting value in a memory;
detecting a real first device; and
when the real first device is detected as installed in the real environment, transmitting the first setting value stored in the memory to the real first device through a communication circuit, the real first device corresponding to the virtual first device.

15. The method of claim 14, wherein the virtual environment information includes at least one of:
space size information of the real environment, spatial acoustic reverberation information of the real environment, color information of the real environment, or obstacle information associated with objects disposed within the real environment, and
wherein the virtual device information includes at least one of:
location information indicating a potential placement of the virtual first device in the real environment,
output information of the virtual first device,
location information indicating where the at least one second device is disposed within the real environment,
output information of the at least one second device,
a user location within the real environment, and
a distance between the potential placement of the virtual first device, the location of the at least one second device, and the user within the real environment.

16. The method of claim 14, further comprising:
simulating an output of the virtual first device within the virtual environment so as to correspond to the determined first setting value.

17. The method of claim 14, further comprising:
detecting real environment information for the real environment in which the real first device is installed;
altering the stored first setting value based on the real environment information; and
transmitting the altered first setting value to the real first device.

18. The method of claim 14, further comprising:
detecting real device information for the real first device disposed in the real environment and the at least one second device in the real environment;
altering the first setting value based on the real device information; and
transmitting the altered first setting value to the real first device using the communication circuit.

* * * * *